(12) United States Patent  (10) Patent No.: US 8,255,537 B2
Hamada et al.  (45) Date of Patent: Aug. 28, 2012

(54) VEHICLE COMMUNICATION DEVICE

(75) Inventors: Yuji Hamada, Tokyo (JP); Yoshitsugu Sawa, Tokyo (JP); Masahiko Ikawa, Tokyo (JP); Hiroshi Araki, Tokyo (JP); Yukio Goto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 370 days.

(21) Appl. No.: 12/526,841

(22) PCT Filed: Feb. 5, 2008

(86) PCT No.: PCT/JP2008/051858
§ 371 (c)(1),
(2), (4) Date: Aug. 12, 2009

(87) PCT Pub. No.: WO2008/099716
PCT Pub. Date: Aug. 21, 2008

(65) Prior Publication Data
US 2010/0049819 A1 Feb. 25, 2010

(30) Foreign Application Priority Data
Feb. 14, 2007 (JP) ................................. 2007-033140

(51) Int. Cl.
*G06F 15/16* (2006.01)
(52) U.S. Cl. ........................................ 709/226; 709/230
(58) Field of Classification Search .................. 709/207, 709/230, 235, 226–227
See application file for complete search history.

(56) References Cited

U.S. PATENT DOCUMENTS

| 6,788,964 | B1 | 9/2004 | Satomura et al. |
| 7,848,278 | B2 * | 12/2010 | Chen et al. ..................... 370/328 |
| 8,014,789 | B2 * | 9/2011 | Breed ......................... 455/456.1 |
| 2002/0061758 | A1 * | 5/2002 | Zarlengo et al. .............. 455/517 |
| 2002/0082021 | A1 | 6/2002 | Chen et al. |
| 2003/0100326 | A1 * | 5/2003 | Grube et al. ................... 455/515 |
| 2003/0153338 | A1 * | 8/2003 | Herz et al. ..................... 455/517 |
| 2004/0170134 | A1 * | 9/2004 | Furuyama et al. ............ 370/310 |

(Continued)

FOREIGN PATENT DOCUMENTS
CN 1360446 A 7/2002
(Continued)

OTHER PUBLICATIONS

U.S. Appl. No. 12/812,895, filed Jul. 14, 2010, Hamada, et al.
(Continued)

*Primary Examiner* — Patrice Winder
*Assistant Examiner* — Ebrahim Golabbakhsh
(74) *Attorney, Agent, or Firm* — Oblon, Spivak, McClelland, Maier & Neustadt, L.L.P.

(57) ABSTRACT

A vehicle communication device for using a plurality of applications in an inter-vehicle communication, and performing a control to avoid congestion of its own vehicle and the other vehicles. There is a vehicle communication device including a plurality of application units for performing the inter-vehicle communication, a lower protocol unit for transmitting and receiving data between vehicles, and a middleware unit intervening between said application units and the lower protocol unit. The middleware unit includes a transfer service processing unit, a communication control service unit, and a transmission/reception control processing unit. The communication control service unit controls a congestion avoiding process of its own vehicle and other vehicles based on application priority received for each of the application units, priority for each vehicle, and channel usage rate obtained from the lower protocol unit.

7 Claims, 24 Drawing Sheets

U.S. PATENT DOCUMENTS

2005/0088318 A1* 4/2005 Liu et al. .................. 340/902

FOREIGN PATENT DOCUMENTS

| | | |
|---|---|---|
| JP | 2000 311294 | 11/2000 |
| JP | 2002 199435 | 7/2002 |
| JP | 2003 258715 | 9/2003 |
| JP | 2004 206624 | 7/2004 |
| JP | 2005 39665 | 2/2005 |
| JP | 2006-50244 | 2/2006 |
| JP | 2006 94179 | 4/2006 |
| JP | 2006-94179 | 4/2006 |
| JP | 2006 209333 | 8/2006 |
| JP | 2006 295751 | 10/2006 |

OTHER PUBLICATIONS

Office Action issued on Feb. 1, 2011 in Chinese Patent Application No. 200880005110.X (with English translation).

Japanese Office Action issued May 10, 2011, in Patent Application No. 2008-558050 (with partial English-language translation).

Masahiko Ikawa, et al., "Design of DSRC Local Communication Platform for Multiple Services", The Journal of the Institute of Electronics, Information, and Communication Engineers, vol. J88-A, No. 2, Feb. 1, 2005, pp. 218-227 (with English translation).

* cited by examiner

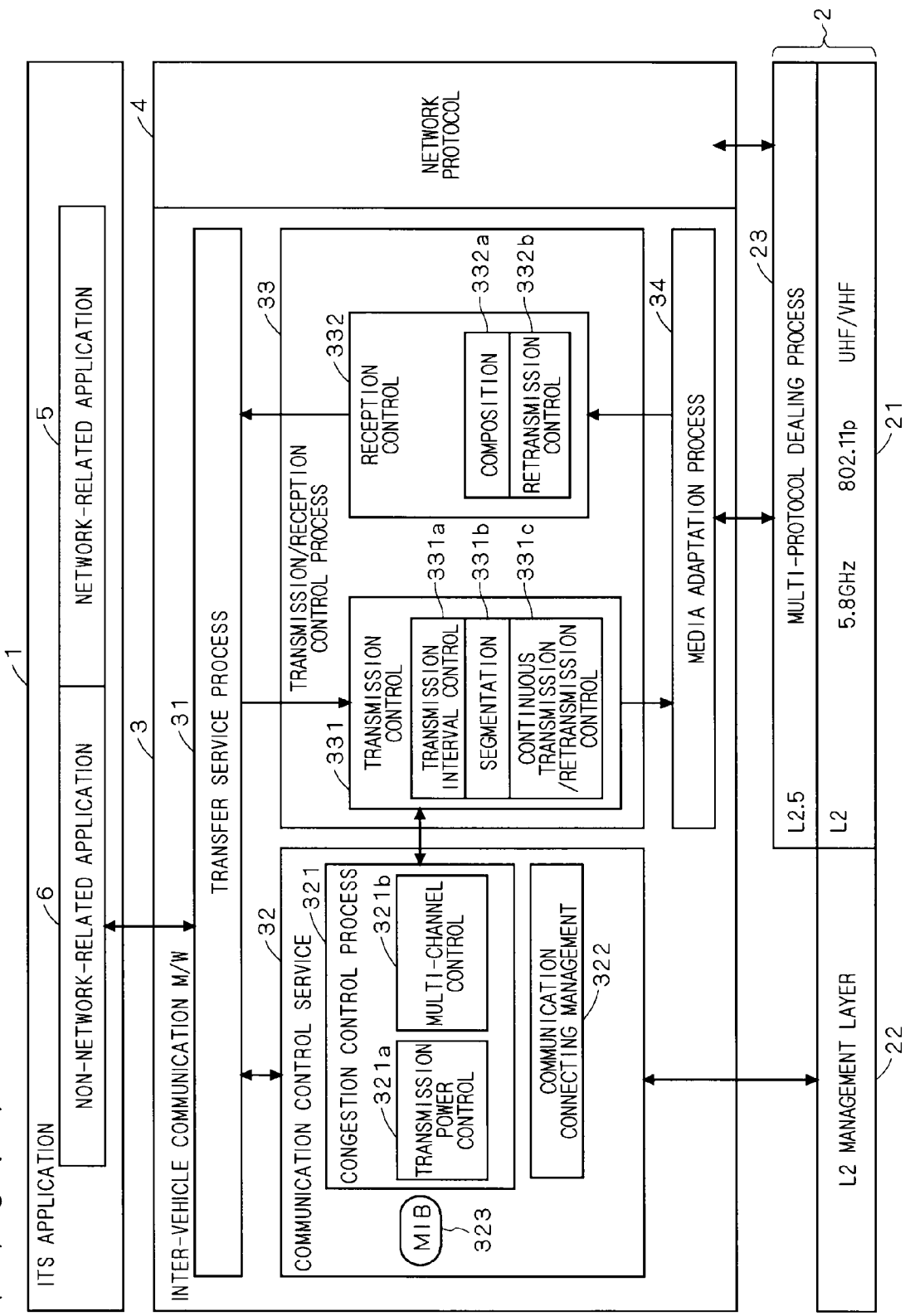

F I G . 7
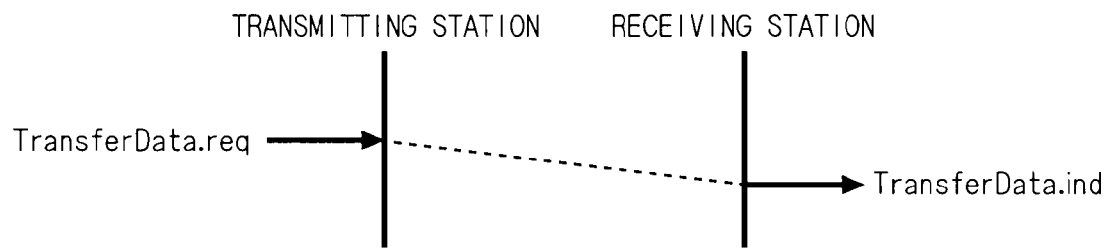
F I G . 8
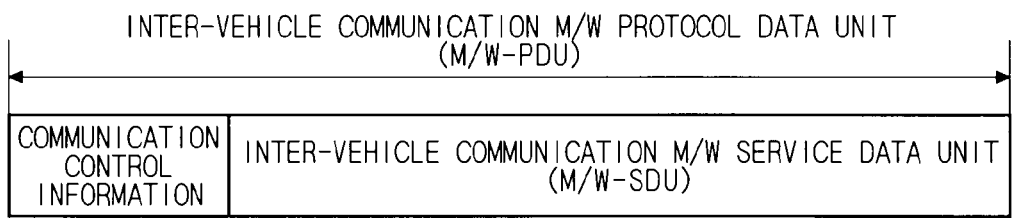

FIG. 9

| | 7 | 6 | 5 | 4 | 3 | 2 | 1 | 0 |
|---|---|---|---|---|---|---|---|---|
| 1 | PORT NUMBER | | | | | | | |
| 2 | | | | | | | | |
| 3 | NODE PRIORITY | | | | | | | |
| 4 | TRANSACTION TYPE | RETRANSMISSION DATA FLAG | RESERVATION | | | | | |
| 5 | TRANSACTION ID | | | | | | | |
| 6 | | | | | | | | |
| 7 | SEGMENT FLAG | SEGMENT LAST FLAG | PDU GROUP NUMBER | | | | | RESERVATION |
| 8 | SEGMENT NUMBER | | | | | | | |
| 9 | CHANNEL FLAG | CHANNEL USAGE RATE | | | | | | |

FIG. 10

| PORT NUMBER | DELIVERY DESTINATION | REMARKS |
|---|---|---|
| 0 | PROHIBITED TO USE | |
| 1 | EVENT TYPE APPLICATION | Brake,Winker,Hazard |
| 2 | INFORMATION-EXCHANGE TYPE APPLICATION | |
| 3-20 | ENTERTAINMENT-RELATED APPLICATION | |
| 21-65535 | RESERVATION | |

FIG. 11

| PORT NUMBER | DELIVERY DESTINATION | REMARKS |
|---|---|---|
| 0 | PROHIBITED TO USE | |
| 1-10 | PRIORITY LEVEL | |
| 11-65535 | RESERVATION | |

F I G . 1 3
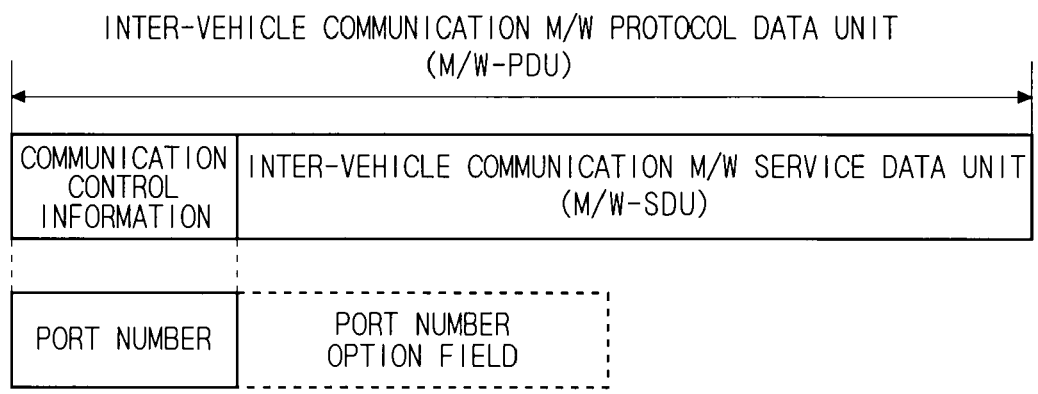

FIG. 14

| 7 | 6 | 5 | 4 | 3 | 2 | 1 | 0 | |
|---|---|---|---|---|---|---|---|---|
| PORT NUMBER FIELD ||||||||1|
| OPTION FIELD OF PORT NUMBER FIELD ||||||||2|
| |||||||| 3 |

F I G . 1 5

| PORT NUMBER | DELIVERY DESTINATION | REMARKS |
|---|---|---|
| 0 | PROHIBITED TO USE | |
| 1-50 | FOR COMMUNICATION CONTROL | SEE ALSO FIG. 10 |
| 51 | ACK | |
| 52 | NACK | |
| 53 | Announcement | |
| 54 | Join | |
| 55 | Challenge Code | FOR AUTHENTICATION |
| 56 | Signiture Code | |
| 57 | Congestion Control | |
| 58-65535 | RESERVATION | |

F I G . 1 6

| | 7 (MSB) | 6 | 5 | 4 | 3 | 2 | 1 | 0 (LSB) |
|---|---|---|---|---|---|---|---|---|
| 1 | | | PORT NUMBER | | | | | |
| 2 | | | | | | | | |
| 3 | | | TRANSACTION ID | | | | | |
| 4 | | | | | | | | |
| 5 | APPLICATION FLAG | | | | APPLICATION NUMBER n | | | |
| 4+2n | APPLICATION INFORMATION 1 | | | | APPLICATION ID | | | |
| 5+2n | | | | | APPLICATION PRIORITY | | | |
| ... | ... | | | | ... | | | |
| 4+2n | APPLICATION INFORMATION n | | | | APPLICATION ID | | | |
| 5+2n | | | | | APPLICATION PRIORITY | | | |
| 6+2n | APPLICATION FLAG | | | | CHANNEL COUNT m | | | |
| 7+2n | CHANNEL INFORMATION 1 | | | | CHANNEL NUMBER | | | |
| 8+2n | | | | | CHANNEL USAGE RATE | | | |
| ... | ... | | | | ... | | | |
| 7+2n+2m | CHANNEL NUMBER m | | | | CHANNEL NUMBER | | | |
| 8+2n+2m | | | | | CHANNEL USAGE RATE | | | |
| | | | | RESERVATION | | | | |

FIG. 17

| | 7(MSB) | 6 | 5 | 4 | 3 | 2 | 1 | 0(LSB) |
|---|---|---|---|---|---|---|---|---|
| 1 | | | | PORT NUMBER | | | | |
| 2 | | | | | | | | |
| 3 | | | | TRANSACTION ID | | | | |
| 4 | | | | | | | | |
| 5 | | | | ResultCode | | | | |
| 6 | | | | APPLICATION NUMBER n(APPLICATION INFORMATION) | | | | |
| | APPLICATION FLAG | | APPLICATION INFORMATION 1 | | | APPLICATION ID | | |
| | | | | ... | | | | |
| | APPLICATION INFORMATION n | | | | | APPLICATION ID | | |

F I G . 1 8

| VALUE | MEANING | NOTIFICATION TARGET | REMARKS |
|---|---|---|---|
| 0 | PROHIBITED TO USE | | |
| 1-3 | NOT IN USE | | |
| 4 | DATA SIZE EXCEEDS UPPER LIMIT | OWN STATION | |
| 5 | TRANSMISSION SERVICE IS DESTROYED | OWN STATION | |
| 6 | SPECIFIED GROUP BROADCASTING LINK ADDRESS IS INEFFECTIVE | OWN STATION | |
| 7-93 | ReservedForFutureUse | | |
| 94-95 | NOT IN USE | | |
| 96 | COMMUNICATION CONNECTING NOTIFICATION | OWN STATION | |
| 97 | NOTIFICATION OF COMMUNICATION DISCONNECTION | OWN STATION | |
| 98-127 | ReservedForFutureUse | | |
| 128 | LOWER LAYER IS NOT CONNECTED | OWN STATION | |
| 129 | PORT NUMBER IS INEFFECTIVE | COUNTERPART STATION | |
| 130 | RECEIVABLE PORT LIST | COUNTERPART STATION | |
| 131 | PORT NUMBER IS NOT SUPPORTED | COUNTERPART STATION | |
| 132-255 | ReservedForFutureUse | | |

FIG. 19

| | 7 (MSB) | 6 | 5 | 4 | 3 | 2 | 1 | 0 (LSB) |
|---|---|---|---|---|---|---|---|---|
| 1 | | | | PORT NUMBER | | | | |
| 2 | | | | | | | | |
| 3 | | | | TRANSACTION ID | | | | |
| 4 | | | | | | | | |
| 5 | RETRANSMISSION DATA FLAG | | | RESERVATION | | | | |

FIG. 20

| | 7(MSB) | 6 | 5 | 4 | 3 | 2 | 1 | 0(LSB) |
|---|---|---|---|---|---|---|---|---|
| 1 | | | | PORT NUMBER | | | | |
| 2 | | | | | | | | |
| 3 | | | | TRANSACTION ID | | | | |
| 4 | | | | | | | | |
| 5 | RETRANSMISSION DATA FLAG | | | RESERVATION | | | | |
| 6 | | | | NUMBER OF SEQUENCE NUMBER OF UNRECEIVED PDU | | | | |
| 7 | | | | | | | | |
| 8 | | | | LIST OF SEQUENCE NUMBER OF UNRECEIVED PDU | | | | |
| 9 | | | | ... | | | | |

FIG. 22

| | 7 | 6 | 5 | 4 | 3 | 2 | 1 | 0 |
|---|---|---|---|---|---|---|---|---|
| 1 | | | | PORT NUMBER | | | | |
| 2 | | | | | | | | |
| 3 | | | | NOTE PRIORITY | | | | |
| 4 | | | | NOTE PRIORITY | | | | |
| 5 | | | | | | | | |
| 6 | CHANNEL FLAG | | CHANNEL COUNT n | | | | | |
| 7 | CHANNEL 1 | | | | CHANNEL NUMBER | | | |
| 8 | | | | | CHANNEL USAGE RATE | | | |
| | | | | | ... | | | |
| | CHANNEL n | | | | CHANNEL NUMBER | | | |
| | | | | | CHANNEL USAGE RATE | | | |
| | PARAMETER OF OWN STATION | | | | TRANSMISSION POWER | | | |
| | | | | | RECEPTION SENSITIVITY | | | |
| | | | | | TRANSMISSION INTERVAL | | | |
| | | | | | RESERVATION | | | |
| | (OPTION) PARAMETER OF COUNTERPART STATION | | | | TRANSMISSION POWER | | | |
| | | | | | RECEPTION SENSITIVITY | | | |
| | | | | | TRANSMISSION INTERVAL | | | |
| | | | | | RESERVATION | | | |

FIG. 23

| CHANNEL USAGE RATE | CONGESTION STATE LEVEL | REMARKS |
|---|---|---|
| 0%~10% | 1 | IDLE STATE |
| 10%~20% | 2 | |
| 20%~30% | 3 | A LITTLE ALLOWANCE |
| 30%~40% | 4 | |
| 40%~50% | 5 | APPROPRIATE |
| 50%~60% | 6 | |
| 60%~70% | 7 | NEARLY CONGESTION |
| 70%~80% | 8 | CONGESTION STATE |
| 80%~ | 9 | COMPLETE CONGESTION STATE |

FIG. 24

| VEHICLE SPEED[km/h] | ASV REQUIRED DISTANCE[m] | TRANSMISSION POWER REQUIRED FOR LEFT COLUMN DISTANCE [dBm] |
|---|---|---|
| 10 | 13 | 0 |
| 20 | 30 | 1 |
| 30 | 50 | 5 |
| 40 | 75 | 8.4 |
| 50 | 103 | 10 |
| 60~ | 136~ | 10 |

FIG. 25

| | 7 (MSB) | 6 | 5 | 4 | 3 | 2 | 1 | 0 (LSB) |
|---|---|---|---|---|---|---|---|---|
| 1 | | | | PORT NUMBER | | | | |
| 2 | | | | | | | | |
| 3 | | | | LENGTH OF RANDOM NUMBER | | | | |
| 4 | | | | CONTENT OF RANDOM NUMBER ... | | | | |

FIG. 26

| | 7(MSB) | 6 | 5 | 4 | 3 | 2 | 1 | 0(LSB) |
|---|---|---|---|---|---|---|---|---|
| 1 | | | | | | | | |
| 2 | PORT NUMBER | | | | | | | |
| 3 | LENGTH OF SIGNATURE | | | | | | | |
| 4 | CONTENT OF SIGNATURE | | | | | | | |
| | ... | | | | | | | |

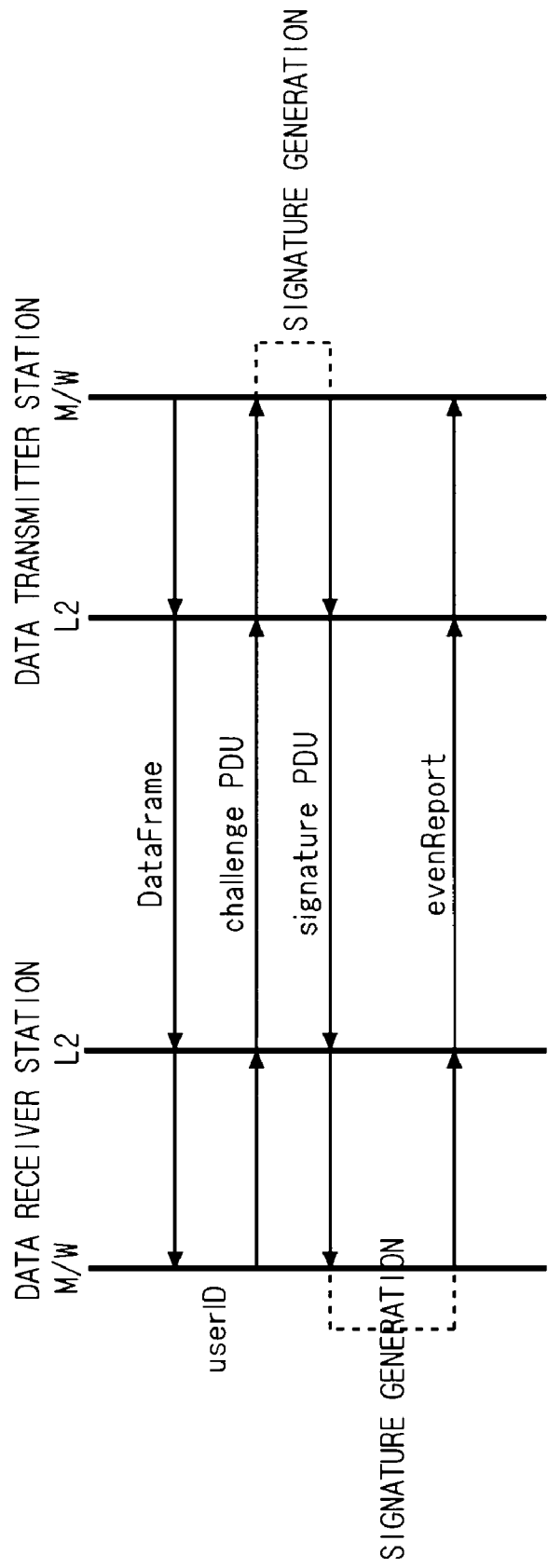

VEHICLE COMMUNICATION DEVICE

TECHNICAL FIELD

The present invention relates to a vehicle communication device, and particularly to a vehicle communication device for inter-vehicle communication.

BACKGROUND ART

In recent years, the plan for putting the driving safety support systems to practical use with a vehicle communication device for inter-vehicle communication is examined. In this plan, an information-exchange type application for transmitting and receiving information of its own vehicle on a constant period among the respective vehicles is generally used.

However, when the number of vehicles existing in a communication area increases, congestion occurs due to the increase of communication traffic, so that the inter-vehicle communication cannot be sufficiently performed, and it is considered that this information-exchange type application cannot provide a safety assisting service.

Therefore, Patent Document 1 discloses a method of avoiding the congestion by performing a transmitting cycle control of its own vehicle based on a dangerous situation of a vehicle and the traffic volume of a channel so that the congestion may not occur in the inter-vehicle communication. Further, Patent Document 2 discloses a method of resetting reception sensitivity, transmission power, antenna directivity, and frequency of its own device on the basis of the danger degree of the vehicle so that the congestion may not occur in the inter-vehicle communication.
Patent Document 1: Japanese Patent Application Laid-Open No. 2006-209333
Patent Document 2: Japanese Patent Application Laid-Open No. 2004-206624

The vehicle communication device disclosed in Patent Document 1 and Patent Document 2 can deal with only a single application as the information-exchange type application, and cannot use other plurality of applications such as an emergency application. Also, the vehicle communication device disclosed in Patent Document 1 and Patent Document 2 cannot ensure a communication band for other plurality of applications such as the emergency application.

Furthermore, the vehicle communication device disclosed in Patent Document 1 and Patent Document 2 avoids the congestion by performing a communication control on only its own vehicle, but the traffic amount of the entire network cannot be immediately reduced only by the communication control of its own vehicle.

DISCLOSURE OF INVENTION

It is an object of the present invention to provide a vehicle communication device for performing a control to avoid the congestion of its own vehicle and other vehicles using a plurality of applications in the inter-vehicle communication.

According to a means for solving the problem of the invention, a vehicle communication device includes: a plurality of application units for performing inter-vehicle communication in accordance with a predetermined purpose; a lower protocol unit for transmitting and receiving data between vehicles; and a middleware unit intervening between said application units and the lower protocol unit, the middleware unit including: a transfer service processing unit for delivering and receiving data to/from said application units and identifying a delivery destination of data received by the middleware unit; a communication control service unit for performing a process to avoid congestion in the inter-vehicle communication and managing a port number for identifying said application units; and a transmission/reception control processing unit for performing a transmission and reception control of the data, wherein the communication control service unit controls a congestion avoiding process of its own vehicle and other vehicles based on application priority received for each of the application units, vehicle priority for each vehicle, and channel usage rate obtained from the lower protocol unit.

The vehicle communication device according to the invention includes the middleware unit intervening between the application units and the lower protocol unit, therefore can control to avoid congestion of its own vehicle and the other vehicles using a plurality of applications in the inter-vehicle communication.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a block diagram of a vehicle communication device according to a preferred embodiment of the invention.

FIG. 7 is a view for illustrating a logical relation between the communication service primitives in the inter-vehicle communication device according to the preferred embodiment of the invention.

FIG. 8 is a view for illustrating an inter-vehicle communication M/W protocol data unit in the inter-vehicle communication device according to the preferred embodiment of the invention.

FIG. 9 is a view for illustrating a field format of the communication control information in the vehicle communication device according to the preferred embodiment of the invention.

FIG. 10 is a view for illustrating an example of setting port numbers in the vehicle communication device according to the preferred embodiment of the invention.

FIG. 11 is a view for illustrating an example of setting priority in the vehicle communication device according to the preferred embodiment of the invention.

FIG. 13 is a view for illustrating a format of the M/W protocol data unit in the vehicle communication device according to the preferred embodiment of the invention.

FIG. 14 is a view for illustrating the field format of the communication control information in the vehicle communication device according to the preferred embodiment of the invention.

FIG. 15 is a view for illustrating a specific example of the port numbers in the vehicle communication device according to the preferred embodiment of the invention.

FIG. 16 is a view for illustrating a format of an announcement message in the vehicle communication device according to the preferred embodiment of the invention.

FIG. 17 is a view for illustrating a format of a join message of the vehicle communication device according to the preferred embodiment of the invention.

FIG. 18 is a view for illustrating a content of a result code in the vehicle communication device according to the preferred embodiment of the invention.

FIG. 19 is a view for illustrating a format of an acknowledgement message in the vehicle communication device according to the preferred embodiment of the invention.

FIG. 20 is a view for illustrating a format of a selective retransmission message in the vehicle communication device according to the preferred embodiment of the invention.

FIG. 22 is a view for illustrating a format of a congestion avoiding control message in the vehicle communication device according to the preferred embodiment of the invention.

FIG. 23 is a view for illustrating the relation of the channel usage rate and a congestion state level of the vehicle communication device according to the preferred embodiment of the invention.

FIG. 24 is a view for illustrating a specific example of setting transmission power in accordance with the vehicle speed of the vehicle communication device according to the preferred embodiment of the invention.

FIG. 25 is a view for illustrating a format of a transmission message of random numbers in the vehicle communication device according to the preferred embodiment of the invention.

FIG. 26 is a view for illustrating a format of a response message of signature in the vehicle communication device according to the preferred embodiment of the invention.

FIG. 27 is a view for illustrating an overview of a device authentication procedure in the vehicle communication device according to the preferred embodiment of the invention.

BEST MODE FOR CARRYING OUT THE INVENTION

Preferred Embodiment

Figure 2:
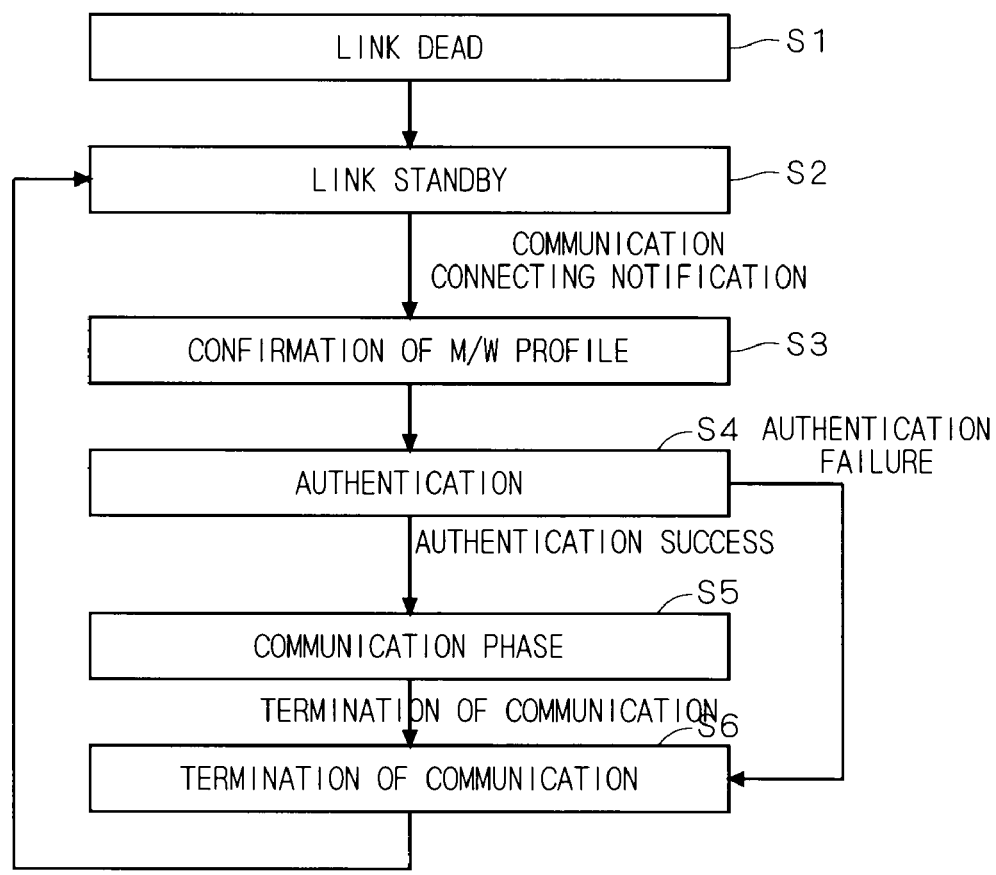
FIG. 2 is a view for illustrating link establishment in the vehicle communication device according to the preferred embodiment of the invention.

A vehicle communication device according to the preferred embodiment includes an ITS (Intelligent Transport Systems) application unit 1 as an application for performing the inter-vehicle communication and putting the driving safety support systems into practical use and as a comfortable and convenient application, and a lower protocol unit 2 for transmitting and receiving data between vehicles. The vehicle communication device according to the preferred embodiment further includes an inter-vehicle communication middleware (M/W: Middle-Ware) unit 3 intervening between the ITS application unit 1 and the lower protocol unit 2. Including this inter-vehicle communication M/W unit 3, the vehicle communication device according to the preferred embodiment is capable of using a plurality of applications complied with the standard of the inter-vehicle communication M/W unit 3, allowing the plurality of applications (including an emergency application) to perform the inter-vehicle communication with each other.

Firstly, the ITS application unit 1 shown in FIG. 1 includes a network-related application 5 for performing communication with the lower protocol unit 2 via a network protocol 4, and a non-network-related application 6 directly running on the inter-vehicle communication M/W unit 3. The network protocol 4 uses IP (Internet Protocol), or a protocol other than IP. While FIG. 1 shows each one of the network-related application 5 and non-network-related application 6, the invention is not limited to this, but a plurality of network-related applications 5 and non-network-related applications 6 may be provided.

Next, in the lower protocol unit 2 shown in FIG. 1, a second layer (L2) 21 which is a data link layer including IEEE802.11p protocol stack and other protocol stack (e.g., such as 5.8 GHz, and UHF/VHF), and an L2 management layer 22 for managing the second layer are illustrated. Further, the lower protocol unit 2 shown in FIG. 1 includes a multi-protocol dealing process layer 23 as a 2.5-th layer (L2.5) for dealing with to multi-protocol. The lower protocol unit 2 shown in FIG. 1 also includes a management information base (MIB) in the L2 management layer 22, and a first layer (L1) to be a physical layer is provided in an underlying layer of the second layer, which are particularly not shown.

Next, the inter-vehicle communication M/W unit 3 is intervened between the lower protocol unit 2 and the non-network-related application 6 in the ITS application unit 1. Then, the inter-vehicle communication M/W unit 3 shown in FIG. 1 includes a transfer service processing unit 31, a communication control service unit 32, a transmission/reception control processing unit 33, and a media adaptation processing unit 34 for complementing a communication function. Further, the inter-vehicle communication M/W unit 3 shown in FIG. 1 provides the non-network-related application 6 with a platform where the lower protocol unit 2 can be ignored by including the above configuration.

The transfer service processing unit 31 delivers and receives data to/from the non-network-related application 6, and identifies a delivery destination of the data received in the inter-vehicle communication M/W unit 3. The communication control service unit 32 includes a congestion control processing unit 321, a communication connecting management unit 322, and a management information base (MIB) 323 to perform communication control of the inter-vehicle communication. The congestion control processing unit 321 includes a transmission power control unit 321a for controlling transmission power to avoid the congestion, and a multi-channel control 321b for avoiding the congestion by changing channels. The congestion control processing unit 321 further has a function to instruct a transmission interval to the transmission/reception control processing unit 33 to avoid the congestion.

The communication connecting management unit 322 manages port numbers identifying the non-network-related application 6 of other vehicles. The inter-vehicle communication M/W unit 3 has be set up the port numbers for identifying the non-network-related application 6 so as to properly deliver data from the non-network-related application 6 to be an origin of the data to the non-network-related application 6 of other vehicles. The management information base (MIB)

323 is stored such as information of a configuration inside the inter-vehicle communication M/W unit 3.

The communication control service unit 32 also has a function to watch the channel usage rate and to ensure a communication band for other plurality of applications such as an emergency application.

The transmission/reception control processing unit 33 includes a transmission control unit 331 for controlling transmission of data, and a reception control unit 332 for controlling reception of data. The transmission control unit 331 performs a process of such as transmission interval and division of data with respect to data transmitted form the non-network-related application 6 via the transfer service processing unit 31, and transmits the data to a lower protocol unit 3. A transmission interval control unit 331a changes a transmission interval of data on the basis of an instruction from the congestion control processing unit 321. A segmentation processing unit 331b divides data into a predetermined size when the data is larger than the predetermined size. A continuous transmission/retransmission control unit 331c transmits the same data continuously for the predetermined number of times, and retransmits the data in accordance with a request for retransmission, so as to raise a packet arrival rate.

On the other hand, the reception control unit 332 performs a process of such as composition of the data received from other vehicles to send to the non-network-related application 6 via the transfer service processing unit 31. A composing processing unit 332a composes data segmented into the predetermined size to restore the data to unsegmented original data. A retransmission control unit 332b sends a retransmission request to a transmission destination so as to make send the data once again when the data cannot be sufficiently received.

The inter-vehicle communication M/W unit 3 shown in FIG. 1 has a complementing function for such as a congestion control process, segmentation and composition control, and a continuous transmission control. These complementing functions can be made as options of the vehicle communication device, which are selectable in accordance with usage so as to be applicable for terminals from low-functionality to high-functionality.

The inter-vehicle communication M/W unit 3 provides a media adaptation process unit 34 so as to implement multiprotocol with respect to the lower protocol unit 3, absorbing a specification unique to a lower layer.

Next, the outline of the communication procedure of the vehicle communication device according to the preferred embodiment will be described. Firstly, it is prerequisite that the inter-vehicle communication M/W unit 3 according to the preferred embodiment performs broadcasting service. Thus, the inter-vehicle communication M/W unit 3 according to the preferred embodiment is usable regardless of communication connection since it is unnecessary to perform link establishment for the broadcasting service. The inter-vehicle communication M/W unit 3 in a state being usable turns immediately to a communication phase being able to perform the inter-vehicle communication using the non-network-related application 6.

On the other hand, unlike the broadcasting service, when individual communication is performed in the inter-vehicle communication M/W unit 3 according to the preferred embodiment, performing the link establishment is necessary. The specific procedure of the link establishment is shown in FIG. 2. In a step S1 shown in FIG. 2, a link is dead. Then, in a step S2, the link enters into a standby mode for the link establishment. When a communication connecting notification is generated in the step S2 for the link establishment of the inter-vehicle communication M/W unit 3, the procedure proceeds to a step S3. In the step S3, an M/W profile of a corresponding station being notified (other vehicle) is compared to that of its own station (its own vehicle) to confirm the available functions in the inter-vehicle communication M/W unit 3.

The procedure proceeds to a step S4 when confirmation of the M/W profile is finished in the step S3, and authentication is performed when the access management function is effective. When the authentication is succeeded in the step S4, the procedure proceeds to a step S5, and the inter-vehicle communication M/W unit 3 makes the non-network-related application 6 be available, shifting the process to an application phase. The non-network-related application 6 in a state being available performs an initial setting for each application, turning to a communication phase being able to perform the communication (step S5). In a step S6, the communication is terminated, and the procedure returns to the step S2. When the authentication fails in the step S4, the procedure proceeds to the step S6, terminating the communication too.

Figure 3:
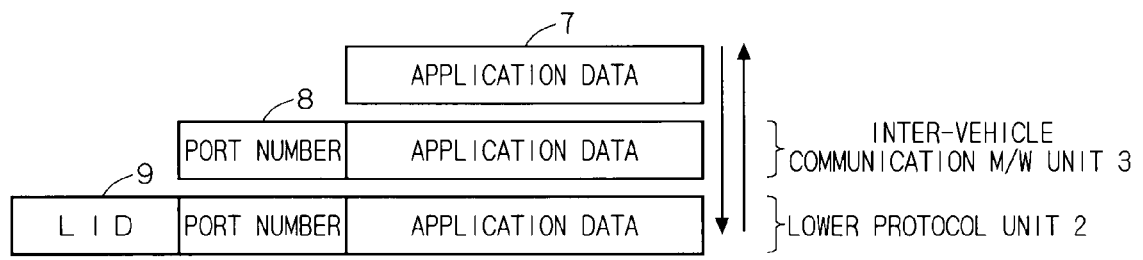
FIG. 3 is a view for illustrating identification of an access point in the vehicle communication device according to the preferred embodiment of the invention.

Next, identification of access points in the non-network-related application 6 according to the present preferred embodiment will be described. A conceptual diagram is shown in FIG. 3. Application data 7 which is data of the non-network-related application 6 is assigned with a port number 8 for identifying the access points in the inter-vehicle communication M/W unit 3. Further, the application data 7 assigned with the port number 8 is assigned with an LID 9 for identifying an inter-vehicle in the lower protocol 2. Here, the port number 8 presupposes the support of a plurality of the non-network-related applications 6, and is used as the number for identifying each of the non-network-related applications 6.

Figure 4:
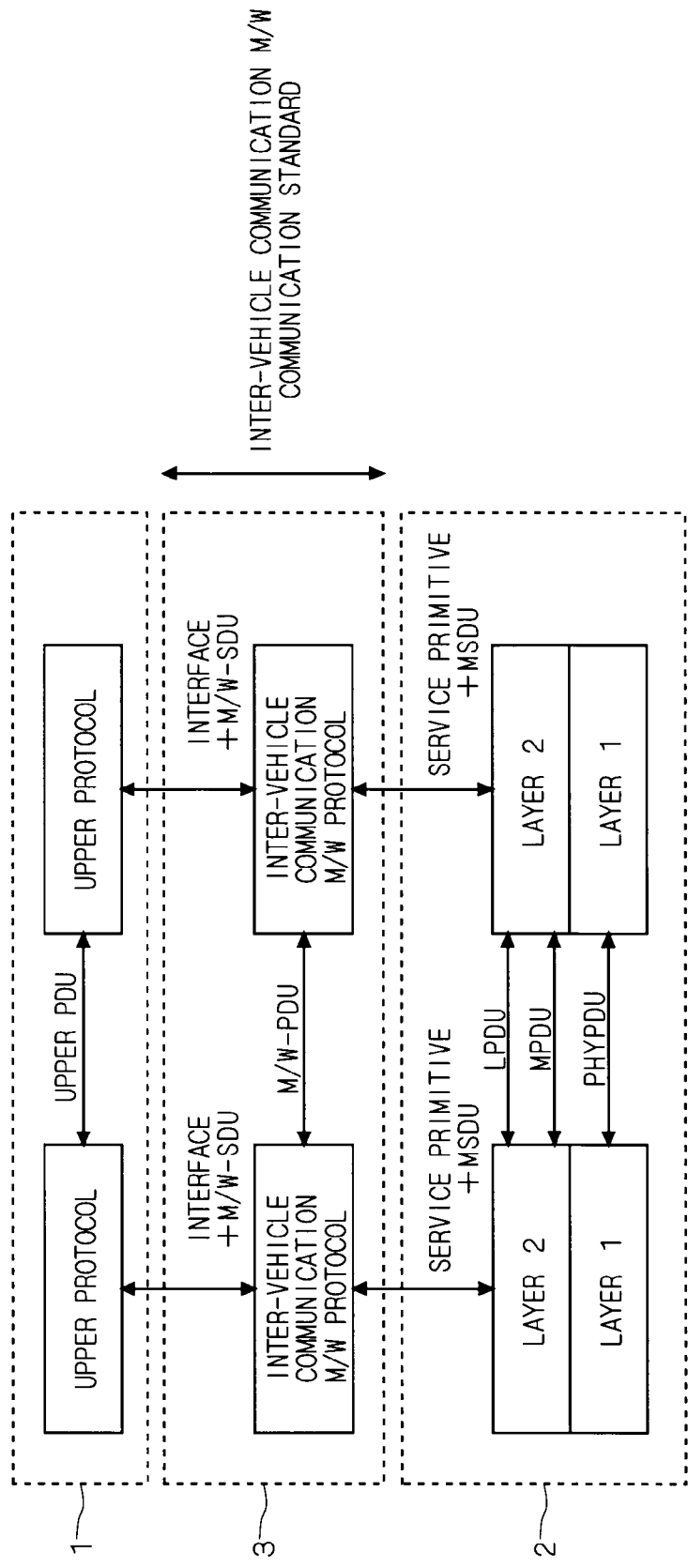
FIG. 4 is a view for illustrating the relation of each service primitive and each protocol in the vehicle communication device according to the preferred embodiment of the invention.

Next, when the vehicle communication device according to the present preferred embodiment shown in FIG. 1 is regarded as a protocol model, the relation between each service primitive and each protocol is shown in FIG. 4. In FIG. 4, two vehicles exchange a protocol data unit (PDU) by using service interface provided in the lower protocol unit 2. Specifically, by exchanging LPDU and MPDU in the layer 2 of the lower protocol unit 2, and PHYPDU in the layer 1, respectively, the protocol of the inter-vehicle communication M/W unit 3 exchanges an M/W-PDU (Middle-ware Protocol Data Unit) between the vehicles via the service primitive, and MSDU (MAC Service Data Unit). An upper protocol of the ITS application unit 1 exchanges an upper PDU between the vehicles via the service primitive, and M/W-SDU (Middle-ware Service Data Unit).

The inter-vehicle communication M/W unit 3 provides the ITS application unit 1 which is the upper protocol with the service primitive and the M/W-SDU, by using a data transfer service for data transfer, and a management service for controlling management as service interfaces. According to the standard of the inter-vehicle communication M/W unit 3 (inter-vehicle communication M/W standard) described later, the service interface defines only the interprocess with the upper protocol, and does not define the specification of the service interface itself.

Next, the congestion avoiding process of the vehicle communication device according to the present preferred embodiment will be described. Firstly, the communication control service unit 32 controls the congestion avoiding process of its own vehicle and the other vehicles on the basis of application priority received for each of the non-network-related applications 6, vehicle priority (including danger degree, required distance, and allowable delay time) of each vehicle, and the channel usage rate obtained from the lower protocol unit 2.

Specifically, each of the non-network-related applications 6 issues a vehicle information setting up request primitive to the inter-vehicle communication M/W unit 3 when the information of its own vehicle is changed, and receives the information of its own vehicle (vehicle ID, vehicle speed, number of communication vehicles, transmission interval, and danger degree). The received information of its own vehicle is stored in MIB 323.

Then, the inter-vehicle communication M/W unit 3 obtains the channel information (channel number, channel usage rate) from MIB of the L2 management layer 22, using the management service interface provided from the lower protocol unit 2. Further, the inter-vehicle communication M/W unit 3 estimates the congestion state level showing whether the congestion is generated shortly or not, on the basis of the information of its own vehicle and the channel information obtained in the communication control service unit 32. When the congestion state level is greater than a predetermined level, the congestion avoiding process is performed by controlling the transmission power and the transmission interval, and changing the channel.

Moreover, in the vehicle communication device according to the present preferred embodiment, the communication control service unit 32 exchanges congestion avoiding control information (including communication control information of its own vehicle, and communication control information which its own vehicle requires the other vehicles) between its own vehicle and the other vehicles, performing the communication control of its own vehicle with reference to the congestion avoiding control information of the other vehicles. Specifically, the inter-vehicle communication M/W unit 3 transmits the congestion avoiding control information generated under a predetermined condition (e.g., the congestion level is greater than the predetermined level) with a constant interval. When the priority and the danger degree of its own vehicle are low, transmitting the congestion avoiding control information is canceled. In contrast, when the priority and the danger degree of its own vehicle are high, the corresponding vehicle is required to implement the congestion avoiding process on the basis of the transmitted congestion avoiding control information. The corresponding vehicle having received the congestion avoiding control information registers the received congestion avoiding control information with a congestion avoiding control profile, performing the congestion avoiding process on the basis of the profile.

(Specification of Inter-Vehicle Communication M/W)

Next, the specification defined in the vehicle communication device, particularly in the inter-vehicle communication M/W will be described in detail below.

1.1 Function of Inter-Vehicle communication M/W

The inter-vehicle communication M/W includes the following functions for complementing the communication function of the lower protocol.

(1) Multi-application conformity
(2) Multi-protocol conformity
(3) Congestion avoiding control
(4) Media adaptation control
(5) Segmentation/composition control
(6) Continuous transmission control
(7) Communication connection management
(8) Retransmission control Also, the inter-vehicle communication M/W provides upper applications with data transfer service for data transfer, and management service for management control.

1.2 Configuration of Inter-Vehicle Communication M/W

Figure 5:
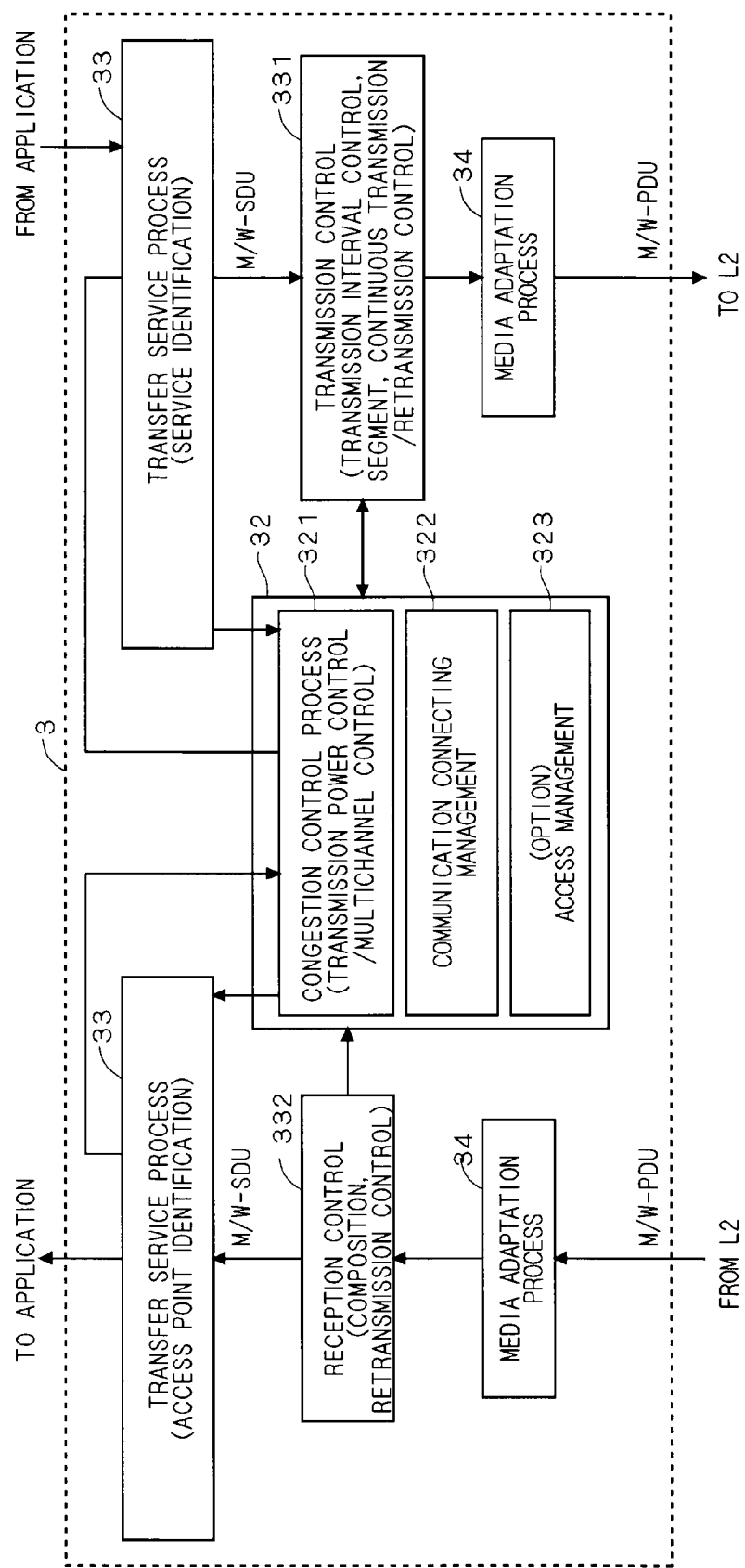
FIG. 5 is a view for illustrating a configuration of the inter-vehicle communication M/W according to the preferred embodiment of the invention.

FIG. 5 illustrates a configuration of the inter-vehicle communication M/W. The inter-vehicle communication M/W unit 3 shown in FIG. 5 is constituted of entities per each function for being capable of adding and deleting each function. That is, a transfer process service unit 33 is provided corresponding to the multi-application function, and a media adaptation processing unit 34 is provided corresponding to the multi-protocol conformity and media adaptation control functions. Further, a congestion control processing unit 321 is provided to correspond to the congestion avoiding control function, and a transmission control 331 and a reception control 332 are provided to correspond to the segment segmentation/composition and continuous transmission control functions, respectively.

Furthermore, a communication connecting management unit 322 is provided corresponding to the communication connecting management function. The communication connecting management unit 322 for managing the inter-vehicle communication M/W unit 3 allocates identifiers of access points equivalent of upper applications to form a peer protocol between management entities. Then, the communication control management unit 322 transmits and receives data between the management entities by using interface of the communication control service unit 32. In addition, the communication control service unit 32 shown in FIG. 5 is provided with an access management unit 324 as an option. This access management unit 324 performs processes such as device authentication process of a data receiving station (mobile station for receiving data), and data transmitting station (mobile station for transmitting data).

1.3 Service Interface

A transfer service processing unit 31 is provided between the inter-vehicle communication M/W unit 3 and the non-network-related application 6, and the transfer service processing unit 31 provides data transfer service interface for data transfer, and management service interface for management control. Also, a media adaptation processing unit 34 is provided between the inter-vehicle communication M/W unit 3 and the lower protocol unit 2, and the media adaptation processing unit 34 performs communication by using service interface provided by a plurality of inter-vehicle communication protocols.

1.4 Protocol

Figure 6:
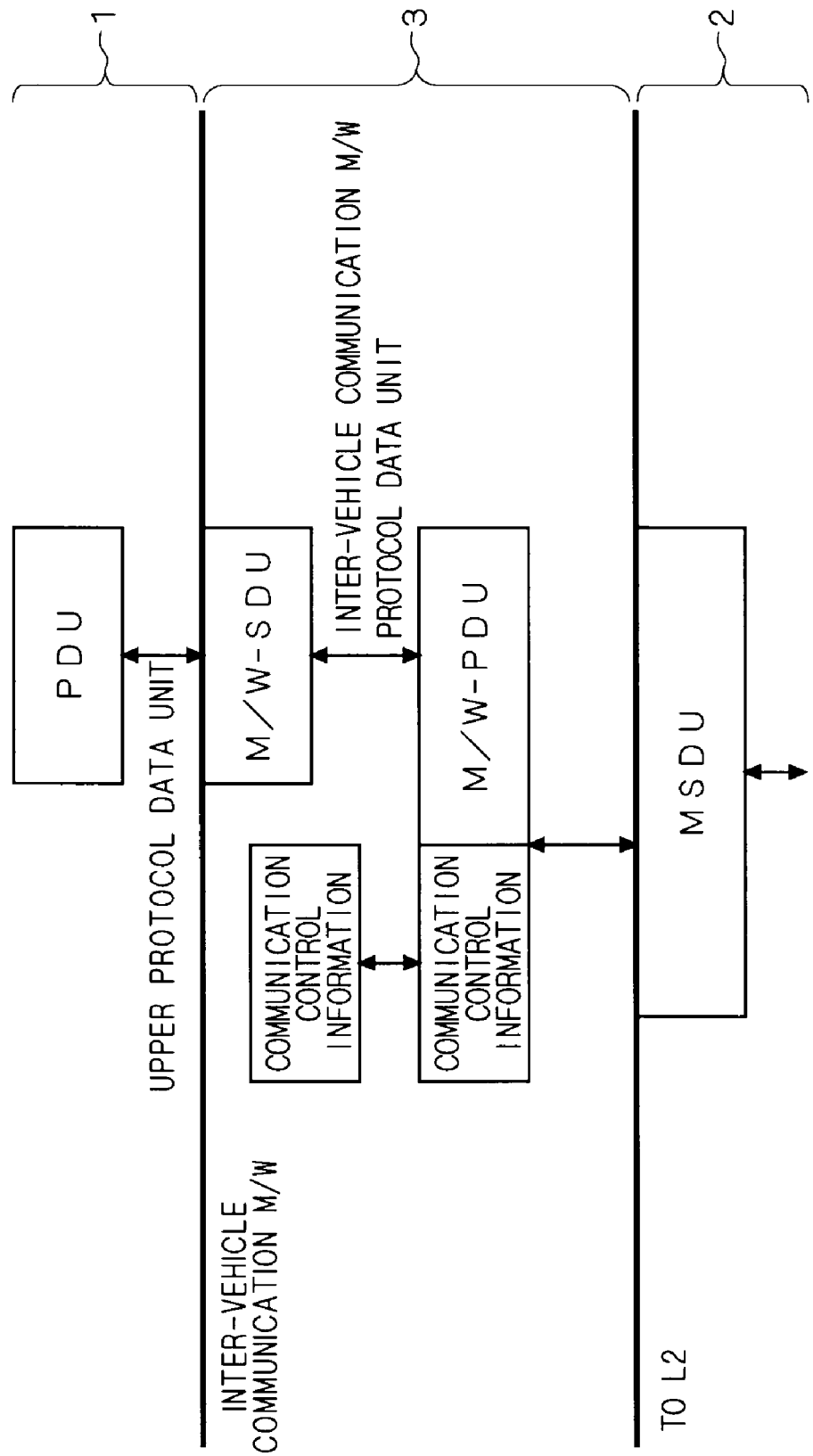
FIG. 6 is a view for illustrating an M/W protocol data unit and M/W service data unit in the inter-vehicle communication device according to the preferred embodiment of the invention.

The procedure of the communication control of the inter-vehicle communication M/W unit 3 is defined by communication control information added by the inter-vehicle communication M/W unit 3. Also, the procedure of the communication control management is defined by the communication control information added by the inter-vehicle communication M/W unit 3. As shown in FIG. 6, this communication control information is coupled to an inter-vehicle communication M/W service data unit (M/W-SDU: Middleware Service Data Unit) passed from the ITS application unit 1 at each protocol. In addition, the inter-vehicle communication M/W service data unit (M/W-SDU) is a PDU in the ITS application unit 1, and the inter-vehicle communication M/W service data unit (M/W-SDU) is an inter-vehicle communication M/W protocol data unit (M/W-PDU) in the inter-vehicle communication M/W unit 3. Further, the communication control information+(plus) the inter-vehicle communication M/W protocol data unit (M/W-PDU) is passed to the lower protocol unit 3, getting into an MSDU.

2 Communication Control
2.1 Data Transfer Service Interface
2.1.1 Overview of Primitive Correlation The communication control of the inter-vehicle communication M/W provides a non-network-related application (hereinafter, also referred to as merely "application") with the following primitives as data transfer service (hereinafter, referred to as "communication service" also).

TransferData.request
TransferData.indication

TransferData.request passes a request for transferring M/W-SDU passed from the application to a corresponding station, to the inter-vehicle communication M/W from the application. TransferData.indication passes information showing arrival of M/W-SDU to the application from the inter-vehicle communication M/W.

2.1.2 Specification of Service Content

Here, primitives and variables regarding the communication service will be defined in the following. The variables as service interface are abstractly described, defining information necessary for an entity at a receiver side. However, specific methods for providing this information are not limited.

The variable linkAddress identifies the corresponding station. A variable PortNo identifies an application of a transfer destination, and communication control service.

The variable Parameter actually passes over M/W-SDU, or passes over a pointer. Or they can also be passed over with other techniques.

The variable Priority shows the priority for each application.

The variable extensionParameter passes over the actual data, or passes over a pointer. Or they can also be passed over with other techniques.

The variable TransmissionMedia identifies communication media to be transmitted.

The variable TransactionType identifies effectiveness/ineffectiveness of a retransmission process.

The logical relation between communication service primitives provided with the application by the inter-vehicle communication M/W is shown in FIG. 7.

2.1.2.1 Data Transmission Request Primitive (1) Function: this primitive is service primitive requesting to transmit M/W-SDU to the corresponding station.

(2) Creation opportunity: this primitive is always created by an application.

(3) Variables of primitive: this primitive has variables of TransferData.request (linkAddress, PortNo, userData, Priority, extensionParameter, TransmissionMedia, TransactionType).

The variable link address stores a link address for identifying the corresponding station. A private link address, or a group broadcast link address can be specified.

A local port number of the application is set to the variable PortNo.

The variable userData stores M/W-SDU passed over from the application of its own station.

The variable Priority shows the priority for each application.

The variable extenstionParameter stores such as allowable delay time and required distance for transmitting M/W-SDU passed over from the application of its own station.

The variable TransmissionMedia stores an identifier for selecting communication media for transmitting M/W-SDU.

The variable TransactionType stores an identifier in which the retransmission process of the variable userData is effective/ineffective.

2.1.2.2 Data Receiving Notification Primitive (1) Function: this primitive is a service primitive for notifying the reception of M/W-SDU from the corresponding station.

(2) Creation Opportunity: this primitive is created by the inter-vehicle communication M/W when showing the reception of M/W-SDU.

(3) Variables of primitive: this primitive has variables of TransferData.indication (linkAddress, PortNo, userData).

The variable linkAddress stores a link address for identifying the corresponding station. A private link address, or a group broadcast link address can be passed over.

A local port number of the application is set to the variable PortNo.

The variable userData stores the received M/W-SDU.

2.2 Protocol Data Unit (PDU)
2.2.1 Format of PDU

The inter-vehicle communication M/W protocol data unit (M/W-PDU) is a PDU of the inter-vehicle communication M/W, and is constituted of a control field (communication control information) storing control information for instructing about a procedure of the inter-vehicle communication M/W defined in 2.3.1 described later, and a information field storing M/W-SDU passed over from the application.

2.2.2 PDU Element
2.2.2.1 Identification of Connection

The link address for identifying a connection is given and received as a variable of a service primitive provided by the lower layer.

2.2.2.2 Format of Control Field

The control field for instructing about the procedure of the inter-vehicle communication M/W stores communication control information. The explanations thereof will be defined in detail in 2.3.1 described later.

2.2.2.3 Format of Information Field

The information field stores M/W-SDU passed over from the application, after dividing or transmitting M/W-SDU.

2.3 Procedural Element of Communication Control
2.3.1 Format of Communication Control Information The communication control information stores the control information instructing about the procedure of the inter-vehicle communication M/W, and is shared between mobile stations (between vehicles) for implementing the procedure. The field format of this communication control information is shown in FIG. 9.

(1) The port number (PortNo) is an identifier instructing about an application and communication control service of a destination. An example of setting the port number is shown in FIG. 10.

(2) The node priority (NodePriority) represents the priority of vehicles. The priority of the corresponding station, and the link address of the corresponding station received from the lower layer are managed in MIB of the inter-vehicle communication M/W. The node priority is used for performing the congestion avoiding control in accordance with the priority of its own station, the priority of the corresponding station, and the channel usage rate, defined in 3.4.2.1 described later, when its own station transmits M/W-PDU. The node priority stores values obtained from a vehicle information setting primitive. An example of setting the priority is shown in FIG. 11.

(3) The transaction type (Transaction Type) specifies the type of a transaction. "0": data transmission transaction type, "1": request and response type transaction service. When this identifier shows "1", the retransmission process is effective, and a message is notified to the corresponding station, obtaining an acknowledgement (ACK) in response to the message.

The request and response type transaction service is available only in individual communications.

(4) The retransmission data flag (RetransmitDataFlag) is a flag representing whether it is retransmitted data or not. When this identifier shows "1", PDU represents retransmitted data.

(5) The transaction ID (TransactionID) is an identifier of a transaction. The respective transactions are distinguished by the transaction ID, and thereby it is also applicable to a situation where a plurality of transactions simultaneously exists between the same applications. The numbering system of the transaction ID is a 16-bit configuration, and is incremented by one for each issuance of a new transaction.

(6) The segment flag (SegmentFlag) is an identifier for instructing effectiveness/ineffectiveness of a segmentation and transfer process. When this identifier shows a true value (true), M/W-PDU is shown to be a segment which is segmented and transferred. When a segmentation process is not performed, this identifier is to be a false value (false).

(7) The segment last flag (SegmentLastFlag) is an identifier showing to be the last segment of the segmentation and transfer process. When this identifier shows a true value (true), the inter-vehicle communication M/W is shown to be the last segment of the segments which are segmented and transferred. When the segmentation process is not performed, and when it is not the last segment, this identifier is to be a false value (false).

(8) The PDU group number (pduGroup) shows identification information of the segments. M/W-SDU before being subjected to a segmentation process is numbered with one value. The numbering is performed by modulo 32 by making a transmission queue into a unit, and M/W-SDU which are not subjected to the segmentation process is numbered. Composing segments being subjected to the segmentation process is performed by targeting the same PDU group number is targeted.

(9) The segment number (SegmentNo) is a serial number showing a segment order of the segments. The first segment is numbered with the segment number "0", and the subsequent segments are allocated in order with incremented values. The order of the segment numbers is secured in the composition of the segments. The segment number where the segmentation and transfer is not applied is to be "0".

(10) The channel flag (ChannelFlag) is an identifier showing whether the communication control information includes channel information or not. When this identifier shows a true value (true), the inter-vehicle communication M/W shows that the control field includes the channel information. When the channel information is not included, this identifier is to be a false value (false).

(11) The channel usage rate (Channel usage rate) is an option, and is a variable representing a rate of the channels for performing transmitting and receiving, being in use (busy). The unit of it is %, and it is set the values from 0 to 100. The channel usage rate of the corresponding station is obtained from this variable, and is compared to the channel usage rate of its own station. When the difference is large, a plurality of mobile stations to be hidden nodes (communication terminals of the corresponding stations which do not overlap with its own station) to its own station is estimated to be present.

2.3.2 Communication Control Variable 2.3.2.1 Maximum Receive Unit (MRU) of Inter-Vehicle Communication M/W The maximum receive unit (MRU: Maximum Receive Unit) of the inter-vehicle communication M/W is a maximum receive length of data which the inter-vehicle communication M/W is able to receive from the upper application. The maximum receive unit (MRU) of the inter-vehicle communication M/W is to be the largest value in the maximum transmission unit (MTU: Maximum Transmission Unit) defined by the implemented application.

2.3.2.2 Segment Unit (SUU) of Segmentation and Transfer

The segment unit (SUU: Segment Unit for Unicast) of the segmentation and transfer is a unit segmenting M/W-SDU when performing the segmentation and transfer, and sets the following values in accordance with the selected profiles. The value of SUU is to be 183 octets.

2.3.2.3 Number of Times of Continuous Transmission (k) in Continuous Transmission Control The number of times of continuous transmission (k) in the continuous transmission control is the number of times repeatedly transmitting M/W-PDU in the continuous transmission control. A receiving error rate of broadcasted data is different depending on a value of k, so that it is necessary to consider the reliability of a system so as to determine the setting of the value.

2.3.3 Communication Service Interface with Lower Layer

The inter-vehicle communication M/W always performs a process through a sub-primitive provided from the media adaptation unit as an interface with the lower layer (lower protocol unit). The inter-vehicle communication M/W uses a primitive which is applicable to a plurality of functional definitions provided from the lower layer.

2.4 Procedure of Communication Control 2.4.1 Procedure of Transfer Service Process (1) Process of Transmission Service When the data transmission request primitive (TransferData.request) is called from the application, M/W-SDU is obtained from the variable Parameter. The resultant M/W-SDU is applied with a transmission interval control process defined in 2.4.3 described later. However, when the size of the resultant M/W-SDU exceeds SUU, a segmentation control defined in 2.4.2 described later is applied before applying the transmission interval control process. M/W-SDU in the following cases is ineffective, and the process is not performed.

(a) When the size of M/W-SDU passed over with the variable Parameter exceeds MRU of the inter-vehicle communication M/W, its request primitive is destroyed, and a state "data size exceeds the upper limit" is reported with an event report primitive (EventReport.indication) to the application having requested the transmission.

(b) When there are no vacancies in the transmission queue, its M/W-SDU is destroyed, and a state "no vacancies in the transmission queue, transmission is failed" is reported with the event report primitive (EventReport.indication) to M/W-SDU having requested the transmission.

(c) When the variable linkAddress is a group broadcast link address, and the address value thereof is not "0", its request primitive is destroyed, and a state "specified group broadcast address is not effective" is reported with the event report primitive (EventReport.indication) to the application having requested the transmission.

(2) Process of Reception Service

When being segmented, after performing a composition control, M/W-PDU is stored in a reception queue, and then an application and communication control service to be a notification destination of the received M/W-PDU are specified in reference to the port number (PortNo) included in the communication control information shown in 2.3.1. At this time, when an application and communication control service to be a delivery destination are not present in its own station, the arrived M/W-SDU is destroyed.

When the notification destination is an application, M/W-SDU is delivered to the application using data receiving notification primitive (TransferData.indication). At this time, the M/W-SDU passed over to the application is extracted by deleting the communication control information from M/W-PDU, and stored in the variable Parameter. The variable linkAddress stores a link address of the corresponding station obtained from a data receiving primitive (SendData.indication) from the lower layer.

Furthermore, when the notification destination is the communication control service, M/W-SDU is delivered to the communication control service. At this time, the M/W-SDU is extracted by deleting the communication control information from M/W-PDU, and the extracted M/W-SDU and the link address of the corresponding station obtained from the data receiving primitive from the lower layer are passed over together to the communication control service.

When the variable transaction type (TransactionType) is "1: request and response type", an acknowledgement is returned. When the variable channel flag (ChannelFlag) is "1", channel information is included, so that the subsequent channel information is stored in a management table (MIB). The variable node priority (NodePriority), the channel usage rate (Channel usage rate), and LID of the corresponding station obtained from the data receiving primitive of the lower layer, are stored in the M/W profile.

2.4.2 Procedure of Segmentation and Composition Control

Whether the segmentation and composition control is applied or not is determined by referring to the M/W profile of the mobile station from the link address of the inter-vehicle communication M/W to be a target or the process.

2.4.2.1 Procedure of Transmitting Station (1) Transfer Control When Segmentation and Transfer Function is Effective With respect to the mobile station where the segmentation and transfer function is effective in the M/W profile, a segmentation process of M/W-SDU shown in the following is performed. First, when M/W-SDU is passed over from the transfer service process, the following process is performed. When the size of M/W-SDU is less than MTU, M/W-PDU is generated by adding the communication control information where the segmentation process is not performed in accordance with the definition in 2.3.1, and passed over to the congestion avoiding control process defined in 2.4.3 described later.

When the size of M/W-SDU exceeds MTU, M/W-SDU is segmented in order from the head in a size of SUU, and M/W-PDU is generated by adding the communication control information in accordance with the definition in 2.3.1 for each segment and it is passed over to a transmission interval control process defined in 2.4.3 described later. At this time, when a transaction requiring the segmentation and composition process has been already performed with respect to the specified LID, a state "during segmentation and transfer" is notified to the application with EventReport.indication.

(2) Transfer Control When Segmentation and Transfer Function is Ineffective

The segmentation and composition control process is not applied with respect to the mobile stations where the segmentation and transfer function is ineffective, in the M/W profile. In this case, M/W-PDU is generated by adding the communication control information where the segment process is not performed in accordance with the definition in 2.3.1, and passed over to a transmission interval control defined in 2.4.3 described later.

2.4.2.2 Procedure of Receiving Station

In the composition process of the receiving station, the communication control information of M/W-PDU stored in the reception queue is referred, and the following process is performed. First, there is a segment in which a segment flag (SegmentFlag) shows a true value (true), and when M/W-PDU from the segment number 0 to the segment number in which a segment end flag shows a true value (true), is entirely stored in the reception queue with the same PDU group number as the above segment, M/W-SDU is reproduced by coupling the segments in order of the segment number, and passed over to the transfer service process. When the segment flag shows a false value (false), M/W-PDU stored in the reception queue is passed over to the transfer service process as M/W-SDU.

2.4.3 Procedure of Transmission Interval Control (1) Process of Transmitting Station (a) The transmission interval control process receives M/W-PDU from the segmentation and composition control, and then extracts priority of an application from the variable Priority received from the data transmission request primitive (TransferData.request), (extracts required distance, and allowable delay time from the option variable extensionParameter).

(b) The transmission interval control passes over the application priority, required distance, and allowable delay time, which are the congestion avoiding control information, to the congestion avoiding control process of the communication control service, as recited in 3.4.2.2 described later.

(c) After the congestion avoiding control process determines parameters of the communication control information with the procedure shown in 3.4.2.2 described later, the transmission interval control waits until the transmission interval Ti and the number of times of continuous transmission k are passed over from the congestion avoiding control process.

(d) Receiving the transmission interval Ti, the transmission control generates M/W-PDU by generating and adding the communication control information in accordance with the definition in 2.3.1. Then, M/W-PDU and the number of time of continuous transmission k are passed over to a continuous transmission control process shown in 2.4.4 described later, after the transmission interval Ti from the previous transmission time point, and the transmission interval control process is completed.

2.4.4 Procedure of Continuous Transmission Control

Data with high priority is continuously transmitted by the continuous transmission control to raise the packet arrival rate. Data with low priority is determined about whether to be continuously transmitted or not, based on the channel situation, and it is not transmitted when the channel is busy, and it is continuously transmitted when the channel is not busy, so as to improve the packet arrival rate.

(1) Control of Transmitting Station

M/W-SDU with the corresponding PDU group number is transmitted k times in reference to the number of times of continuous transmission k passed over from the transmission interval control, and is passed over to the media adaptation processing unit. With the completion of k times repeat, all the segments with the corresponding PDU group number are destroyed.

(2) Control of Receiving Station

M/W-SDU where the PDU group number of the communication control information is overlapped is destroyed.

2.4.5 Procedure of Retransmission Control

The retransmission process is applied when the communication control information of TransactionType=1 is specified.

(1) Transmission Process (a) The data transfer service where the retransmission process is effective is started by issuing the data transmission request primitive (TransferData.request) with the application of TransactionType=1.

(b) M/W-PDU of TransactionType=1 is generated, and transmitted to the corresponding station using the data transfer primitive (SendData.request) provided by the lower layer, and then a retransmission timer is started up, waiting for receiving the acknowledgement (ACK) from the corresponding station.

(c) When the retransmission timer started up in (b) is timed out before receiving ACK with some reasons, such that PDU transmitted in (b) does not arrive, a retransmission flag (Retransmit Flag) of PDU transmitted in (b) is set to be 1. Then, after retransmitting to the corresponding station, the retransmission timer is restarted, and the retransmission counter is incremented.

(d) After repeating the retransmission several times, when a retransmission counter exceeds the maximum retransmission number of times, failure of the transaction is notified to the application with the event report primitive (EventReport.indication), and the transaction is completed.

(e) When ACK transmitted from the corresponding station by the data transfer primitive provided by the lower layer is received before the retransmission timer is timed out, the retransmission timer started up in (b) or (c) is stopped, then this transaction is completed.

(2) Reception Process (a) Received with the data transfer primitive (SendData.request) provided by the lower layer, M/W-PDU is passed over to the segmentation and composition control.

(b) When PDU received in (a) is TransactionType=1, ACK is generated, and is transmitted to the corresponding station with the data transfer primitive provided by the lower layer, and a wait timer is started.

(c) When PDU received in (a) is received again with the reasons such that ACK transmitted in (b) does not arrive, this PDU is destroyed, and ACK is generated again and transmitted to the corresponding station with the data transfer primitive (Send Data.request) provided by the lower layer, and the wait timer is restarted.

(d) When the wait timer started up in (b) or (c) is timed out, this transaction is completed.

2.4.6 Procedure of Media Adaptation Control

The media adaptation control is constituted of data transfer service of a plurality of lower layers and data transfer service of the inter-vehicle communication M/W, and provides a control to absorb the difference between the inter-vehicle communication M/W and the lower layers. For instance, assuming a communication protocol of an existing lower layer to be 5.8 GHz and IEEE 802.11p, each of the primitives between the lower layer and the application is shown as follows.

(a) 5.8 GHz

Data transfer primitive Send (segment flag, data serial number, transmission data)

Data Receiving Primitive Receive (Reception Data)

(b) IEEE 802.11p

WSM-WaveShortMessage.request (ChannelInfo, WSMversion, SecurityType, ApplicationID, ApplicationContextMark, TransmissionPriority, Length, Data, PeerMacAddress)

WSM-WaveShortMessage.indication (ChannelInfo, WSMversion, SecurityType, ApplicationID, ApplicationContextMark, TransmissionPriority, Length, Data, PeerMacAddress)

Among the variables of the above primitives, the ones supported by the inter-vehicle communication M/W are mapped, and the others not supported are added to a data unit of PDU and passed over. The media adaptation processing unit can select communication media for transmitting data in accordance with a usage situation of the communication media of the lower layer and a request from the application.

3. Communication Control Management 3.1 Management Service Interface 3.1.1 Overview of Primitive Correlation The communication control management of the inter-vehicle communication M/W provides the application with the following management service.

(1) Event Report Service

The event report service provides with the primitive of EventReport.indication.

The primitive EventReport.indication passes to the application of the corresponding station or its own station from the inter-vehicle communication M/W in order to report an event such as an error occurred in the inter-vehicle communication M/W.

(2) Vehicle Information Setting Service

The vehicle information setting service provides with the primitive of SetVehicleInfo.request.

The primitive SetVehicleInfo.request passes to the inter-vehicle communication M/W from the application in order to request the inter-vehicle communication M/W to set the information of a vehicle.

(3) MIB Access Service

The MIB access service provides with the following primitive.

MeGet.request
MeGet.indication
MeSet.request
MeSet.indication

The primitive MeGet.request passes to the inter-vehicle communication M/W from the application in order to request to obtain the MIB variable of the inter-vehicle communication M/W. The primitive MeGet.indication passes to the application from the inter-vehicle communication M/W in order to notify of obtaining the MIB variable of the inter-vehicle communication M/W. The primitive MeSet.request passes to the inter-vehicle communication M/W from the application in order to request to set the MIB variable of the inter-vehicle communication M/W. The primitive MeSet.indication passes to the application from the inter-vehicle communication M/W in order to notify a setting result of the MIB variable of the inter-vehicle communication M/W.

(4) (Option) Connection Management Service

The connection management service provides with the following primitives.

M/W-Application.request
M/W-Application.confirm
M/W-Application.indication
M/W-Application.response
RegisterPort.request
DeregisterPort.request The primitive M/W-Application.request passes to the inter-vehicle communication M/W from the application of its own station in order to notify the service provided by the application of its own station. The primitive M/W-Application.confirm passes to the application of its own station from the inter-vehicle communication M/W in order to return a response to the primitive M/W-Application.request. The primitive M/W-Application.indication notifies to the application of its own station from the inter-vehicle communication M/W in order to notify the service provided by the application of the corresponding station, and to request a confirmation whether to connect to the corresponding station or not.

The primitive M/W-Application.response passes to the inter-vehicle communication M/W from the application in order to return a response to the primitive M/W-Application- .indication. The primitive RegisterPort.request passes to the inter-vehicle communication M/W from the application in order to register an application which the application can provide to the inter-vehicle communication M/W. The primitive DeregisterPort.request passes to the inter-vehicle communication M/W from the application in order to notify an application which the application cannot provide to the inter-vehicle communication M/W.

3.1.2 Specification of Service Content

Here, primitives and variables regarding the communication service will be defined. The variables as an interface are abstractly described to define information necessary for an entity at a receiver side. However, specific methods for providing this information are not limited.

The variable linkAddress distinguishes access points of its own station and the corresponding station for each application. The variable Parameter actually passes over M/W-SDU, or passes over a pointer. Or they can also be passed over with other techniques. The variable extensionParameter and the variable mibParameter pass over the actual data, or pass over a pointer. Or they can also be passed over with other techniques. The variable status shows a state value to the event. The variable mibIndex passes over a variable name instructing the actual MIB variable, or passes over a pointer. Or they can be also passed over with other techniques. The variable mibStatus shows success/unsuccess to the request. The variable PortNo shows the port number of the application. The variable Priority shows the priority of the provided application.

Figure 12:
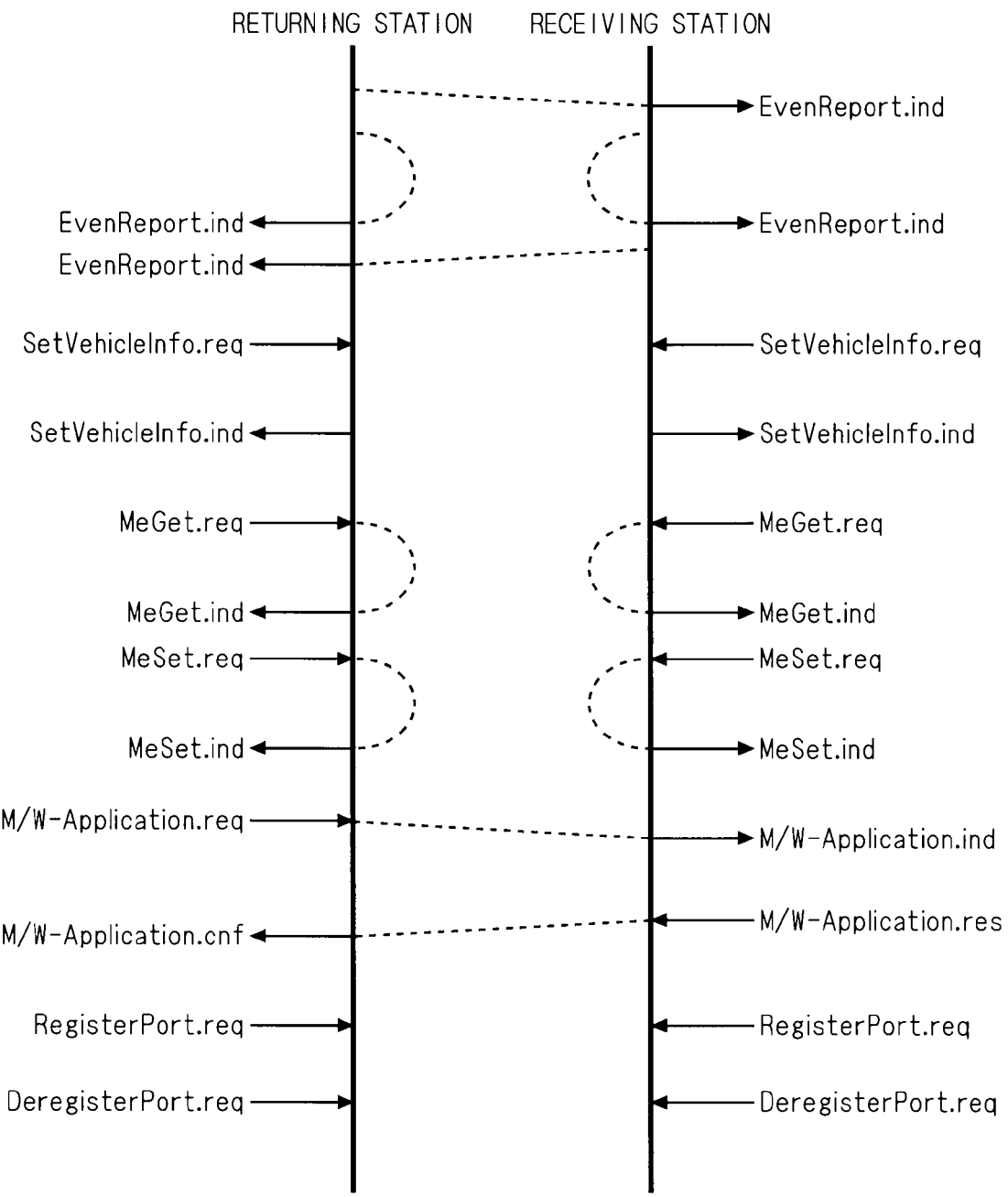
FIG. 12 is a view for illustrating the logical relation between management service primitives in the vehicle communication device according to the preferred embodiment of the invention.

The correlation between the management service primitives provided by the inter-vehicle communication M/W to the application is shown in FIG. 12.

3.1.3 Event Report Service

The event report service is a service reporting an event such as an error occurred in the inter-vehicle communication M/W, and the inter-vehicle communication M/W provides a next service primitive.

3.1.3.1 Event Report Primitive (1) Function: this primitive is a service primitive reporting an event such as an error occurred in the inter-vehicle communication M/W.

(2) Creation opportunity: this primitive is created by the inter-vehicle communication M/W when reporting an event such as an error occurred in the inter-vehicle communication M/W to the application.

(3) Variables of primitive: this primitive has variables of EventReport.indication (linkAddress, status, [extensionParameter]).

The variable linkAddress stores a link address used in the inter-vehicle communication.

The variable status stores a code showing the generated event.

The variable extensionParameter stores information for complementing the content of the variable status as needed. This variable is to be an option.

3.1.4 Vehicle Information Setting Service

The vehicle information setting service is a service for providing vehicle information to the inter-vehicle communication M/W from the application, and the inter-vehicle communication M/W provides a next service primitive.

3.1.4.1 Vehicle Information Setting Up Request Primitive (1) Function: this primitive is a primitive for regularly transmitting the vehicle information in the application to the inter-vehicle communication M/W.

(2) Creation opportunity: this primitive is generated by the application when the vehicle information is updated in the application.

(3) Variables of primitive: this primitive has a variable of SetVehicleInfo.request (VehicleParameters). The variable VehicleParameters stores the vehicle information of its own vehicle.

3.1.5 MIB Access Service

The MIB access service is a service provided by the MIB management function of the communication control management, for setting and referring the MIB variable of the inter-vehicle communication M/W. In the MIB access service, the inter-vehicle communication M/W provides a next service primitive.

3.1.5.1 MIB Variable Acquisition Request Primitive (1) Function: this primitive is a service primitive for requesting an acquisition of the MIB variable of the inter-vehicle communication M/W.

(2) Creation opportunity: this primitive is always generated by the application.

(3) Variable of primitive: this primitive has a variable of MeGet.request (mibIndex). The variable mibIndex stores a variable name instructing the MIB variable.

3.1.5.2 MIB Variable Acquisition Report Primitive (1) Function: this primitive is a service primitive for reporting an acquisition of the MIB variable of the inter-vehicle communication M/W.

(2) Creation opportunity: this primitive is always generated by the inter-vehicle communication M/W.

(3) Variables of primitive: this primitive has variables of Meget.indication (mibIndex, mibStatus, [mibParameter]).

The variable mibIndex stores a variable name instructing the MIB variable.

The variable mibStatus stores the result of implementing the request.

The variable mibParameter stores the content of the resultant MIB variable, being omitted when the instructed MIB variable does not exist, or a value is not set.

3.1.5.3 MIB Variable Storage Request Primitive (1) Function: this primitive is a service primitive for requesting to set the content of the MIB variable of the inter-vehicle communication M/W.

(2) Creation opportunity: this primitive is always generated by the application.

(3) Variables of primitive: this primitive has variables of MeSet.request (mibIndex, [mibParameter]).

The variable mibIndex stores a variable name instructing the MIB variable.

The variable mibParameter stores the content of the MIB variable to be set, and is to be a request to destroy the content of the variable when being omitted.

3.1.5.4 MIB Variable Acquisition Report Primitive (1) Function: this primitive is a service primitive for reporting the result of setting the MIB variable of the inter-vehicle communication M/W.

(2) Creation opportunity: this primitive is generated by the inter-vehicle communication M/W when showing the result of setting the MIB variable of the inter-vehicle communication M/W.

(3) Variable of primitive: this primitive has variables of MeSet.indication (mibIndex, mibStatus).

The variable mibIndex stores a variable name instructing the MIB variable having been set.

The variable mibStatus stores the result of implementing the request.

3.1.6 (Option) Connection Management Service

The connection management service provides an AnnouncementFrame transmission start function for registration/deletion of the application in the inter-vehicle communication M/W and starting an initial connection by providing the application with the following services.

(1) Service for managing/observing the connection situation of the lower layer, and reporting the connection situation and notifying a new connection/disconnection in accordance with the request from the application.

(2) Service for managing a receivable port number of the corresponding station by notifying the receivable port number with each other between the connection management services, and reporting the situation thereof and notifying of a certain port being receivable in accordance with the request from the application.

The connection management service is placed at the same position as the application on the inter-vehicle communication M/W, and transmission and reception of an event between the connection management services is performed using the data transfer service provided by the lower layer.

3.1.6.1 Service Report Request Primitive (1) Function: this primitive is a service primitive for requesting to start transmission of Announcement Frame for an initial connection.

(2) Creation opportunity: this primitive is always generated by the application.

(3) Variables of primitive: this primitive has variables of M/W-Application.request (linkAddress, PortNo).

The variable linkAddress stores a link address for identifying the corresponding station. A private link address, or a group broadcasting link address can be specified.

A local port number of the application is set in the variable PortNo.

3.1.6.2 Service Report Confirmation Primitive (1) Function: this primitive is a service primitive for returning a response to the service report request primitive.

(2) Creation opportunity: this primitive is always generated by the inter-vehicle communication M/W.

(3) Variable of primitive: this primitive has a variable of M/W-Application.confirm (ResultCode). The variable ResultCode stores a code showing the result.

3.1.6.3 Service Report Receiving Primitive (1) Function: this primitive is a service primitive for reporting a reception of Announcement Frame for an initial connection.

(2) Creation opportunity: this primitive is always generated by the inter-vehicle communication M/W.

(3) Variable of primitive: this primitive has variables of M/W-Application.indication (linkAddress, PortNo).

The variable linkAddress stores a link address for identifying the corresponding station. The private link address, or the group broadcasting link address can be specified.

The local port number of the application is set in the variable PortNo.

3.1.6.4 Service Report Response Primitive (1) Function: this primitive is a service primitive for responding to the service report receiving primitive.

(2) Creation opportunity: this primitive is always generated by the application.

(3) Variable of primitive: this primitive has a variable of M/W-Application.response (ResultCode). The variable ResultCode stores a code showing the result.

3.1.6.5 Application Registration Primitive (1) Function: this primitive is a service primitive for registering the application supported by the application with the inter-vehicle communication M/W.

(2) Creation opportunity: this primitive is always generated by the application.

(3) Variables of primitive: this primitive has variables of RegisterPort.request (PortNo, Priority).

The local port number of the application is set in the variable PortNo.

The variable Priority stores the priority of the application.

3.1.6.6 Application Deregistration Primitive (1) Function: this primitive is a service primitive for deregistering the application registered with the inter-vehicle communication M/W.

(2) Creation opportunity: this primitive is always generated by the application.

(3) Variable of primitive: this primitive has a variable of DeregisterPort.request (PortNo). The local port number of the application is set in the variable PortNo.

3.2 Protocol Data Unit (PDU)

3.2.1 Format of PDU

The communication control management for managing the inter-vehicle communication M/W is allocated with port numbers equivalent to the application in order to form a peer protocol between the management entities, allowing transmission and reception of data between the management entities using the communication service interface of the communication control.

The format of M/W-PDU is shown in FIG. 13. M/W-PDU is constituted of a control field (communication control information) storing the control information for instructing the procedure of the inter-vehicle communication M/W, and an information field (M/W-SDU) storing PDU of the upper application.

3.2.2 PDU Element 3.2.2.1 Connection Identification

The port number for identifying the communication control management is given and received in the control field of M/W-PDU. Further, the link address or the like for the connection identification is given and received as a variable of the service primitive provided by the communication control of the inter-vehicle communication M/W.

3.2.2.2 Format of Control Field

The control field for instructing about the procedure of the communication control management stores communication control information constituted of a port number and an option field of the port number. The field format of this communication control information is shown in FIG. 14.

(1) Port Number Field (PortNo)

The port number field stores values for identifying access points of the communication control management.

(2) Option Field of Port Number Field

The option field of the port number field stores control information for instructing the procedure of the communication control management. Further, the port number field has an option field where additional information for complementing the control content is multiplexed, and the communication control management uses this option field as needed. The communication control management defines identification information shown in FIG. 15, and defines a message shared between the mobile stations.

3.2.2.3 Format of Information Field

The information field is to be NULL (data having a length of 0).

3.3 Communication Connection Management 3.3.1 Procedural Element of Communication Connection Management 3.3.1.1 M/W Profile An M/W profile is to show the characteristic of the inter-vehicle communication M/W to the corresponding station, and is constituted of a function list implemented in the inter-vehicle communication M/W, and an application list which can be offered. The M/W profile includes the following variables.

(1) Version Information

The version information shows version information of the inter-vehicle communication M/W. In the standard it is set to "0".

(2) Mobile Station Identification Information

The mobile station identification information stores an identifier for identifying a mobile station. In principle, a unique value is allocated in the mobile station.

(3) Connection Management Timer Value of Mobile Station

The connection management timer value of the mobile station shows Tmax to be set in a communication connection management timer CT for managing a connection state between its own station and the corresponding station, and a time scale is to be millisecond. The connection management timer value of the mobile station is set in the range of 0 to 4095. When a value is set to "0", it means infinite.

(4) Application Identification Information

The application identification information stores an identifier for instructing about the types of applications supported by the mobile station. The application identification information is registered with an application registration primitive.

(5) Function Identification Information of Inter-Vehicle Communication M/W

The function identification information of the inter-vehicle communication M/W stores an identifier for identifying functions supported by the inter-vehicle communication M/W of the mobile station.

(6) Communication Protocol Identification Information of Lower Layer

The communication protocol identification information of the lower layer stores an identifier for identifying communication protocol supported by the lower layer of the mobile station.

3.3.1.2 Management Control Variable 3.3.1.2.1 Communication Connection Management Timer (CT, Tmax)

The communication connection management timer is a timer for observing a state of communication connection between its own station and the corresponding station connected thereto. CT is generated for each communication connection with the corresponding station, and destroyed at the end of the communication with the mobile station. Tmax is a maximum timer value possible to be set in CT.

3.3.1.2.2 Watchdog Timer for Transmission Schedule (WTTS)

The watchdog timer for transmission schedule is a timer of its own station for watching whether the regular transmission to the corresponding station is secured. The watchdog timer for transmission schedule is generated for each communication connection with the corresponding station, and destroyed at the end of the communication with the mobile station. Tmax set in the communication connection management timer is set in this watchdog timer for transmission schedule.

3.3.1.3 Format of Communication Connection Management Information

In the communication connection management, the communication connection management information stores control information for instructing the procedure of the connection management so as to define a message shared between the mobile stations.

3.3.1.3.1 Announcement Message (AnnouncementPDU)

The announcement message is a message for transmitting announcement data. The format of the announcement message is shown in FIG. 16.

(1) Port Number (PortNo)

The port number stores an identifier showing an announcement message of the communication control management. Specifically, the port numbers shown in FIG. 15 are stored.

(2) Transaction ID (TransactionID)

The transaction ID distinguishes each transaction, thereby being applicable to the situation where a plurality of transactions exists at the same time between the same applications. The numbering system of the transaction ID is a 16-bit configuration, and is incremented by one for each issuance of a new transaction.

(3) Application Flag (ApplicationFlag)

The application flag is an identifier for showing whether or not application information is included in the announcement message. When this identifier shows a true value (true), the inter-vehicle communication M/W shows that application information which can be provided by its own station is included in the control field. When application information is not included, this identifier is to be a false value (false). The application information includes application number described later, application ID, and application priority.

(4) Application Number (ApplicationNumber)

The application number shows the total number of applications which can be provided.

(5) Application ID (ApplicationID)

The application ID is an identifier for identifying the applications. Referring to the M/W profile, the registered application ID is stored.

(6) Application priority (Application Priority)

The application priority shows the priority of applications.

(7) Channel Flag (ChannelFlag)

The channel flag is an identifier for showing whether or not the channel information is included in the announcement message. When this identifier shows a true value (true), the inter-vehicle communication M/W shows that the control field includes the channel information watched by its own station. When the channel information is not included, this identifier is to be a false value (false).

(8) Channel Count

The channel count shows the total number of channels watched by its own station.

(9) Channel Number

The channel number shows an identifier for identifying the channels.

(10) Channel Usage Rate

The channel usage rate is a variable representing a rate of the channels for performing transmission and reception, being in use (busy). Its unit is %, and its values from 0 to 100 are set. The channel usage rate of the corresponding station is obtained from this variable, and is compared to the channel usage rate of its own station. When the difference is large, a plurality of mobile stations to be hidden nodes to its own station is estimated to be present.

(11) Reservation Field

The reservation field is a field previously ensured for future expanding.

3.3.1.3.2 Join Message (joinPDU)

The join message is a message for requesting to join so as to complete the initial connection. The format of the join message is shown in FIG. 17.

(1) Port Number

The port number stores an identifier for showing the join message of the communication control management. Specifically, the port numbers shown in FIG. 15 are stored.

(2) Transaction ID

The transaction ID distinguishes each transaction, thereby being applicable to the situation where a plurality of transactions exists at the same time between the same applications. The numbering system of the transaction ID is a 16-bit configuration, and is incremented by one for each issuance of a new transaction.

(3) Result Code

The result code shows the result about whether the initial connection is performed or not. The result code reports "not connecting" when the application to be supported is different from that of the counterpart to be connected, and reports "connecting" when the application to be supported exists. The content of the result code is shown in FIG. 18.

(4) Application Flag (ApplicationFlag)

The application flag is an identifier for showing whether or not the application information is included. When this identifier shows a true value (true), the inter-vehicle communication M/W shows that the control field includes application information which can be supported by both of its own station and the corresponding station. When the application information is not included, this identifier is to be a false value (false). The application information includes the application ID.

(5) Application Number (ApplicationNumber)

The application number shows the total number of the application which can be supported by both of its own station and the corresponding station.

(6) Application ID (ApplicationID)

The application ID shows an identifier for identifying the application which can be supported by both of its own station and the corresponding station.

3.3.1.3.3 Acknowledgement Message (ACKPDU)

The acknowledgement message is a message for returning the acknowledgement when retransmission is requested. The format of the acknowledgement message is shown in FIG. 19.

(1) Port Number

The port number stores an identifier for showing the acknowledgement message of the communication control management. Specifically, the port numbers shown in FIG. 15 are stored.

(2) Transaction ID

The transaction ID distinguishes each transaction, thereby being applicable to the situation where a plurality of transactions exists at the same time between the same applications. The numbering system of the transaction ID is a 16-bit configuration, and is incremented by one for each issuance of a new transaction.

(3) Retransmission Data Flag

The retransmission data flag is a flag representing whether it is retransmitted data or not. When this flag shows "1", PDU represents retransmitted data.

(4) Reservation Field

The reservation field is a field previously ensured for future expanding.

3.3.1.3.4 Selective Retransmission Message (NACKPDU)

The selective retransmission message is a message of the selective retransmission process of the segmentation and composition process. The format of the selective retransmission message is shown in FIG. 20.

(1) Port Number

The port number stores an identifier for showing the selective retransmission message of the communication control management. Specifically, the port numbers shown in FIG. 15 are stored.

(2) Transaction ID

The transaction ID distinguishes each transaction, thereby being applicable to the situation where a plurality of transactions exists at the same time between the same applications. The numbering system of the transaction ID is a 16-bit configuration, and is incremented by one for each issuance of a new transaction.

(3) Retransmission Data Flag

The retransmission data flag is a flag representing whether it is retransmitted data or not. When this flag shows "1", PDU represents retransmitted data.

(4) Number of Sequence Number of Unreceived PDU

The number of sequence number of unreceived PDU shows the number of segments of unreceived PDU.

(5) List of Sequence Number of Unreceived PDU

The list of sequence number of unreceived PDU shows the list of the segment number of unreceived PDU.

3.3.2 Procedure of Communication Connection Management 3.3.2.1 Usage Condition of Lower Layer When the available applications exist at least more than one, the inter-vehicle communication M/W makes it possible to use the lower layer environment, as principle.

3.3.2.2 Initial Connection Procedure

Figure 21:
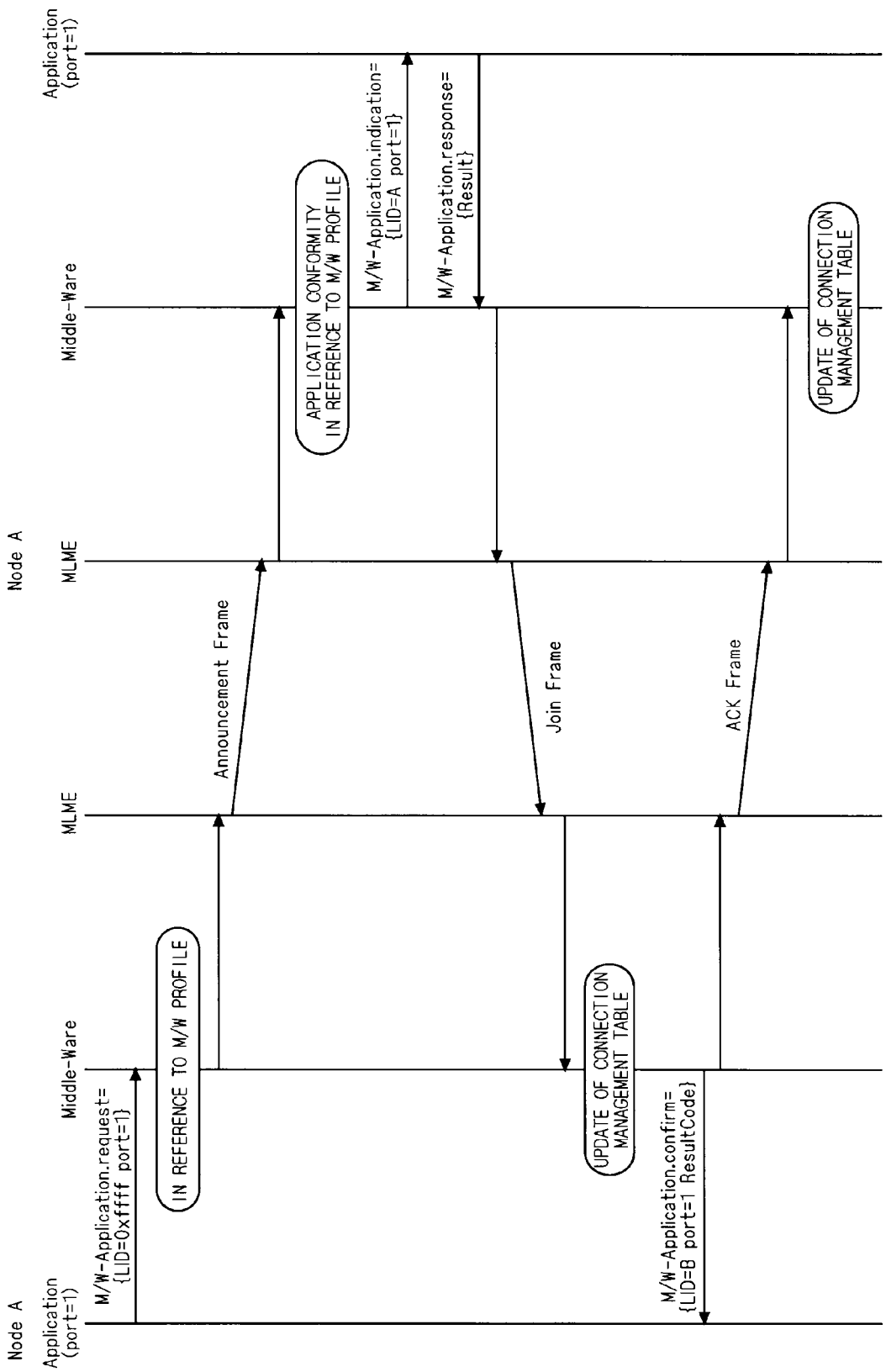
FIG. 21 is a view for illustrating an initial connection procedure of the vehicle communication device according to the preferred embodiment of the invention.

The initial connection procedure of a normal application using individual communication is shown. It should be noted that the application using broadcasting communication could be implemented without the initial connection procedure. The procedure is shown in FIG. 21, and the details will be described below.

(1) Each application of the mobile station reports the receivable port number to the communication connection management of the inter-vehicle communication M/W using the application registration primitive (RegisterPort.request).

(2) The communication connection management registers the port number of the application shown by the variable PortNo with the inter-vehicle communication M/W profile.

(3) The application for performing individual communication requests transmission of AnnouncementPDU to the inter-vehicle communication M/W of the node A (Node A) using the service report request primitive (M/W-Application.request). The M/W-Application.request shown in FIG. 21 satisfies LID=0xffff, and a node of LID is not particularly specified.

(4) The inter-vehicle communication M/W of the node A (Node A) generates AnnoucementPDU in accordance with the definition in 3.3.1.3.1 referring to the inter-vehicle communication M/W profile, and then transmits through the transfer service process by the data transmission primitive provided by the lower layer (MLME: MAC layer management entity).

(5) The inter-vehicle communication M/W of the node B (Node B) receives AnnouncementPDU and compares it to the application identification information included in the AnnouncementPDU with the M/W profile of its own station, and regards only an application supported by both of them to be effective.

(6) When the application supported by the inter-vehicle communication M/W of the node B (Node B) is connectable, for request of a connection to the corresponding station, Join-PDU is generated in accordance with the definition in 3.3.1.3.2, and then transmitted to the node A (Node A). When it is unclear whether it is connectable or not, whether it is connectable to the application or not is inquired using a service report receiving primitive (M/W-Application.indication) to obtain the result with a service report response primitive (M/W-Application.response), the result thereof being reported with JoinPDU.

(7) The inter-vehicle communication M/W of the node A (Node A) having received JoinPDU updates a connection management table from the result included in JoinPDU, and generates and transmits ACK in accordance with the definition in 3.3.1.3.3 so as to return the acknowledgement to the corresponding station (node B (Node B)), completing the initial connection. Also, the node A (Node A) reports the result to the application with a service report confirmation primitive (M/W-Application.confirm).

(8) The inter-vehicle communication M/W of the node B (Node B) having received the acknowledgement ACK updates the connection management table to complete the initial connection.

(9) Thereinafter, the communication between the mobile stations which are completed to be connected is possible.

3.3.2.3 Communication Connection Management Procedure

The procedure for performing a maintenance management of the communication connection of the mobile station will be described below.

In the communication control management of the mobile station, the communication connection management timer (CT) is generated at the time of a communication connection. The generated communication connection timer is set a value with the maximum timer value (Tmax) of the mobile station, and is started up. Thereinafter, the communication connection timer is restarted whenever a report of receiving the effective service primitive is received from the mobile station.

When the effective service primitive is not received from the mobile station, and the communication connection timer is timed out, a state "report of communication disconnection" is issued to the available application with the event report primitive. Then the communication control management of the mobile station terminates the use of the application to the mobile station, and at the same time updates the connection management table. Further, the process to the mobile station and the communication connection timer are terminated at the time of communication disconnection, and a new connection report or a standby of broadcasting reception is to be performed.

3.4 Congestion avoiding control Function 3.4.1 Procedural Element of Congestion Avoiding Control Function 3.4.1.1 Congestion State Level The congestion state level stores a level of a current usage state of a channel determined by the inter-vehicle communication M/W.

3.4.1.2 Transmission Power Level

The transmission power level shows a level of a power for transmitting.

3.4.1.3 Reception Sensitivity Level

The reception sensitivity level shows a threshold level of the power which makes receiving possible.

3.4.1.4 Channel Count

The channel count shows the total number of channels available in the inter-vehicle communication.

3.4.1.5 Channel Number

The channel number shows the unique number to the channels.

3.4.1.6 Channel Usage Rate

The channel usage rate shows a rate of busy channels in the specified channel number.

3.4.1.7 Congestion Avoiding Control Profile

The congestion avoiding control profile shows the congestion characteristic of the stations existing nearby, and is constituted of such as the channel usage rate in the mobile station existing nearby. This congestion avoiding control profile includes the following contents.

(1) Version information
(2) Mobile station identifier (LID)
(3) Port number
(4) Node priority
(5) Transmission power
(6) Reception sensitivity
(7) Transmission interval
(8) Transmission channel
(9) Channel usage rate 3.4.1.8 Management Control Variable 3.4.1.8.1 Communication Vehicle Number The communication vehicle number stores the number of vehicles currently being in communication with its own vehicle. This value is set based on a vehicle information setting up request primitive (SetVehicleInfo.request), or is set by the application based on an MIB information setting up request primitive (MeSet.request).

3.4.1.8.2 Maximum Transmission Power (MaxTransmitPower)

The maximum transmission power shows a maximum transmission power realizable by the transmission power control.

3.4.1.8.3 Minimum Transmission Power (MinTransmitPower)

The minimum transmission power shows a minimum transmission power realizable by the transmission power control.

3.4.1.8.4 Maximum Reception Sensitivity (masSensitivity)

The maximum reception sensitivity shows maximum reception sensitivity in the realizable reception sensitivity.

3.4.1.8.5 Minimum Reception Sensitivity (minSensitivity)

The minimum reception sensitivity shows minimum reception sensitivity in the realizable reception sensitivity.

3.4.1.9 Format of Congestion Avoiding Control Information

In the congestion avoiding control, control information (congestion avoiding control information) for instructing the procedure of the congestion avoiding control is stored in the control field to define a message shared between the mobile stations.

3.4.1.9.1 Congestion Avoiding Control Message

The congestion avoiding control message is a message for transmitting the congestion avoiding control information to the corresponding station. The format of the congestion avoiding control message is shown in FIG. 22.

(1) Port Number (PortNo)

The port number is an identifier instructing an application and communication control service of a destination. Specifically, the port numbers shown in FIG. 15 are stored.

(2) Node Priority (NodePriority)

The node priority represents the priority of vehicles. The node priority manages the priority of the corresponding station, and the link address of the corresponding station received from the lower layer, in MIB of the inter-vehicle communication M/W. The node priority is used for performing the communication control in accordance with the priority of its own station, the priority of the corresponding station, and the channel usage rate, when its own station transmits PDU.

(3) Transaction Type (TransactionType)

The transaction type specifies a type of a transaction and stores it. "0": data transmission transaction service, "1": request and response type transaction service. When this identifier shows "1", the retransmission process is effective, and a message is notified to the counterpart, obtaining an acknowledgement (ACK) in response to the message. The request and response type transaction service is only applicable in individual communications.

(4) Retransmission Data Flag (Retransmit Data Flag)

The retransmission data flag is a flag representing whether it is retransmitted data or not. When this flag shows "1", PDU represents retransmitted data.

(5) Transaction ID (TransactionID)

The transaction ID distinguishes each transaction by transactions, thereby being applicable to the situation where a plurality of transactions exists at the same time between the same applications. The numbering system of the transaction ID is a 16-bit configuration, and is incremented by one for each issuance of a new transaction.

(6) Segment Flag (SegmentFlag)

The segment flag is an identifier for instructing effectiveness/ineffectiveness of a segmentation and transfer. When this identifier shows a true value (true), M/W-PDU is shown to be a segment which is segmented and transferred. When a segmentation process is not performed, this identifier is to be a false value (false).

(7) Segment Last Flag (SegmentLastFlag)

The segment last flag is an identifier showing to be the last segment of the segmentation and transfer. When this identifier shows a true value (true), the inter-vehicle communication M/W is shown to be the last segment of the segments which are segmented and transferred. When the segmentation process is not performed, and when it is not the last segment, this identifier is to be a false value (false).

(8) PDU Group Number (pduGroup)

The PDU group number is identification information of the segments. M/W-SDU before being subjected to a segmentation process is numbered by the PDU group number with one value. The numbering is performed by modulo 32 with a transmission queue as a unit, and M/W-SDU which are not subjected to the segmentation process is numbered, too. When composing the segments being subjected to the segmentation process, the same PDU group number is targeted.

(9) Segment Number (SegmentNo)

The segment number is a serial number showing a segment order of the segmentations. The first segment to be segmented is numbered with the segment number "0", and the subsequent segments are allocated in order with incremented values. The order of the segment numbers are secured in composition of the segments. The segment number where the segmentation and transfer are not applied is to be "0".

(10) Channel Flag (ChannelFlag)

The channel flag is an identifier showing whether the communication control information includes channel information or not. When this identifier shows a true value (true), the inter-vehicle communication M/W shows that the control field includes the channel information. When the channel information is not included, this identifier is to be a false value (false).

(11) Channel Count (ChannelCount)

The channel count shows the total number of channels included in the communication control information.

(12) Channel Number (ChannelNumber)

The channel number shows the number for identifying the channels.

(13) Channel Usage Rate (Channel Usage Rate)

The channel usage rate is a variable representing a rate of the channels for performing transmission and reception, being in use (busy). The unit of it is %, and it is set the values from 0 to 100. The channel usage rate of the corresponding station is obtained from this variable, and is compared to the channel usage rate of its own station. When the difference is large, a plurality of mobile stations to be hidden nodes to its own station is estimated to be present.

(14) Own Vehicle Parameter Field (MyParameter)

The own vehicle parameter field includes; (a) transmission power sub-field, (b) reception sensitivity sub-field, and (c) transmission interval sub-field. The own vehicle parameter field shows each parameter of transmission power, reception sensitivity, and transmission interval of its own vehicle, which are currently set.

(15) Request Parameter Field to Corresponding Vehicle (OtherParameter)

The request parameter field to the corresponding vehicle includes; (a) transmission power sub-field, (b) reception sensitivity sub-field, and (c) transmission interval sub-field. The request parameter field to the corresponding vehicle shows each parameter of transmission power, reception sensitivity, and transmission interval, settings of which are requested from its own vehicle to the corresponding station in the current situation.

3.4.2 Procedure of Congestion Avoiding Control 3.4.2.1 Congestion Estimating Procedure The mobile station implements the following congestion avoiding control procedure when a version possible to communicate can be selected based on version information of a congestion avoiding control profile.

(1) The application issues a vehicle information setting up request primitive (SetVehicleInfo.request) to the inter-vehicle communication M/W when the information of its own vehicle is changed, and receives information of its own vehicle (vehicle ID, vehicle speed, number of communication vehicles, transmission interval, and danger degree). The received information is stored in MIB.

(2) The inter-vehicle communication M/W obtains channel information (channel number, channel usage rate) from the MIB of the lower layer using a management service interface provided by the lower layer.

(3) Next, the inter-vehicle communication M/W estimates the congestion state level showing whether the congestion is occurred shortly or not, using the obtained own vehicle information and channel information. One of examples of the congestion estimating is shown below. This example shows a method of performing the congestion estimating by referring to only the channel usage rate. In the inter-vehicle communication, CSMA (Carrier Sense Multiple Access) is assumed to be used, so that it is estimated to be a congestion state when the channel usage rate reaches to 75%, considering an inter-frame space (IFS: Inter Frame Space). The relation between the channel usage rate and the congestion state level is shown in FIG. 23.

3.4.2.2 Procedure of Congestion Avoiding Control

The congestion avoiding control combines transmission power control, reception sensitivity control, multi-channel control, and transmission interval control to determine parameters of communication control information such as transmission power, reception sensitivity, transmitting cycle, and transmission channel. Furthermore, the congestion avoiding control determines the number of times of the continuous transmission in the continuous transmission control so as to improve a packet arrival rate, and a communication protocol of the lower layer for transmitting packet, in accordance with the priority of applications, the priority of vehicles (including danger degree, required distance, and allowable delay time), and the channel usage rate. The procedure of the congestion avoiding control in the inter-vehicle communication M/W will be described below.

3.4.2.2.1 Congestion Avoiding Control at the Time of Transmission of Application Data (1) The congestion avoiding control obtains the priority of applications included in the data transmission request primitive (TransferData.request), (required distance from option variable extensionParameter, and allowable delay time), the congestion state level set in 3.4.2.1, and the congestion avoiding control profile defined in 3.4.1.7.

(2) One of examples of adaptive congestion avoiding control is shown (single channel). The congestion avoiding control is performed with the following procedure.

(A) Regardless of the priority of applications and the channel usage rate, a transmission power (transmitPowerLevel) to be a reference is set by a transmission power control on the basis of vehicle speed, the vehicle speed (speed) being obtained with the vehicle information acquisition request primitive. One of examples of transmission power setting based on the vehicle speed is described below. In this example, transmission power is set to be able to communicate only in a distance required for the vehicle to stop in the ASV (Advanced Safety Vehicle) project. Specifically, the relation is shown in FIG. 24.

(B) The communication control is performed depending on the congestion state level.

(a) When the congestion state level is less than "4": the congestion does not occur even with increase of communication traffic.

(i) The transmission power is set to be a maximum transmission power (10 mW), and the transmitting cycle is set to be a reference of a transmission interval (100 msec). When the priority of the application and danger degree is high, the number of times of the continuous transmission is set to be twice (congestion state level 3, and 4), and three times (congestion state level 1, and 2) so as to enhance the reliability.

(b) When the congestion state level is "5" and "6": appropriate traffic amount which does not cause congestion.

(i) When the priority of the application and danger degree is low, the transmission power is set in accordance with (A), and the transmitting cycle is set in accordance with the setting of the application.

(ii) When the priority of the application and danger degree is high, the transmission power is set to be a maximum transmission power (100 mW), and the transmitting cycle is set to be a transmitting cycle set by the application.

(c) When the congestion state level is greater than "7": nearly in a congestion state.

(i) When the priority of the application and danger degree is low, the transmission power is set to be smaller than (A), and the transmitting cycle is set to be longer. Also, when the priority of the application and danger degree is low, if there are any parameters of the communication control information required from the other vehicles to the congestion avoiding control profile, it is set to be a value thereof.

(ii) When the priority of the application and danger degree is high, the transmission power is set so as to satisfy a required distance, and the transmitting cycle is set so as to satisfy an allowable delay time.

(iii) When there is a plurality of lower layers, and a lower protocol transmitted to the application is not specified, a communication protocol using a frequency that is not busy is selected, and a parameter of the communication control information is set in accordance with the congestion state level in that frequency.

(iiii) When a plurality of channels can be used, a transmission channel that is not busy is selected, and a parameter of the communication control information is set in accordance with the congestion state level in that transmission channel.

(3) The transmission power, reception sensitivity, and transmission channel determined in (2), are set in the MIB of the lower layer using the management service interface provided by the lower layer, and the transmitting cycle, the number of times of the continuous transmission, and the lower protocol are passed over to the transmission interval control unit, completing the congestion avoiding control.

3.4.2.2.2 Congestion Avoiding Control at the Time of Transmission of Congestion Avoiding Control Data (1) Process of Transmitting Station (a) The inter-vehicle communication M/W generates congestion avoiding control information in accordance with the definition in 3.4.1.9. The timing and opportunity to generate is the time when the congestion state level exceeds "5", for example, and it is transmitted with a constant interval, for example.

(b) The transmission power, reception sensitivity, and transmitting cycle set by algorithm recited in 3.4.2.2.1 are set to the parameters of the communication control information of its own station. When the priority of its own station and the priority of the application are low, the congestion avoiding control information is canceled to be transmitted, and when the priority of its own station and the priority of the application are high, the parameters of the communication control information required to the corresponding station are set to be lower than the transmission power of its own station, and the transmitting cycle is set to be longer.

(c) M/W-PDU to which the congestion avoiding control information is added, is passed over to the transfer service control, completing the transmission process.

(2) Process of Receiving Station (a) After M/W-PDU showing the congestion avoiding control information is received from the transfer service process, the congestion avoiding control process registers the received congestion avoiding control information with the congestion avoiding control profile, completing the receiving process.

3.5 Access Management 3.5.1 Procedural Element of Access Management 3.5.1.1 Security Profile The security profile is information to be effective when a security function is registered with function identifying information of the inter-vehicle communication M/W of the M/W profile. In the access management, the security profile is referred to when a device authentication function is effective, setting such as option information.

(1) Device Authentication Effectiveness Identifier (Authenticate)

The device authentication effective identifier is an identifier for instructing effectiveness/ineffectiveness of the device authentication function. When this identifier shows a true value (true), device authentication is performed. When the device authentication is not performed, this identifier is set with a false value (false).

(2) Device Identifier (userID)

The device identifier is an identifier of the mobile station used for the device authentication. This identifier is used only in the mobile station, and stores NULL (data with a length of 0) in a base station.

(3) Device Authentication Algorithm Identifier (authenticationMethod)

The device authentication algorithm identifier is an identifier of signing algorithm used for the device authentication. This identifier is an option, and stores an identifier of algorithm when signing algorithm is specified. When the device authentication algorithm identifier does not exist, default signing algorithm is used. It should be noted that the device authentication algorithm identifier is assumed to be specified by a system provider.

3.5.1.2 Default Signing Algorithm

The default signing algorithm does not perform a signing operation by random number and password, but treats password of a plain text as an operation result when default is selected.

3.5.1.3 Number of Times of Authentication Trial (NA)

The number of times of authentication trial (NA) is the number of times of allowing an authentication request retried by the mobile station. The base station allows retrial when the number of times of retrial by the same mobile station is less than NA times, and the communication is disconnected when it exceeds NA times. It should be noted that a value of the number of times of authentication trial is not defined as implementation requirements.

3.5.1.4 Format of Access Control Information

In the access management, access control information stores control information for instructing the procedure of the access management, and a message shared between the mobile stations is defined.

3.5.1.4.1 Transmission Message of Random Numbers (ChallengeCodePDU)

The transmission message of random numbers is a message for transmitting random numbers to be signature origin data. The format of the transmission message of random numbers is shown in FIG. 25.

(1) Port Number

The port number stores an identifier showing the transmission message of random numbers of the communication control management.

(2) Option Field of Port Number

The option field of the port number stores the following content.

(a) Identifier for Length of Random Numbers

The identifier for length of random numbers instructs about the data length of the subsequent random numbers. The unit is octet.

(b) Content of Random Numbers

The random numbers are to be variable length data from 0 to 255 octets.

3.5.1.4.2 Response Message of Signature (SignaturePDU)

The response message of signature is a message for transmitting the signature result with respect to the received random numbers of signature origin. The format of the response message of signature is shown in FIG. 26.

(1) Port Number

The port number stores an identifier showing the response message of signature of the communication control management.

(2) Option Field of Port Number

The option field of the port number stores the following content.

(a) Identifier for Length of Signature

The identifier for length of signature instructs the data length of the subsequent signature. The unit is octet.

(b) Content of Signature

The signature is to be variable length data from 0 to 255 octets.

3.5.2 Procedure of Access Management

FIG. 27 shows an outline of the device authentication procedure. Hereinafter, the device authentication procedure will be described referring to FIG. 27.

3.5.2.1 Initial Setting of Device authentication (1) Initial Setting of Data Receiving Station The data receiving station receives an instruction with the data receiving primitive from the lower layer, and shifts a state to the device authentication process. At this time, the content of the security profile in the M/W profile obtained from this primitive is confirmed with the following procedure.

(a) When a value of a device authentication effectiveness identifier is a true value (true), a content of a signing algorithm identifier is confirmed, and an algorithm shown in that identifier is selected. On the other hand, when the signing algorithm identifier does not exist, a default algorithm is selected.

(b) Next, a device identifier is referred to, and a password corresponding to that identifier is obtained to shift to an authentication process defined in 3.5.2.2 (1) described later. It should be noted that a method of obtaining a password is not defined.

(c) When a security profile of the data transmitting station does not exist, and when a value of the device authentication effectiveness identifier of the security profile is a false value (false), the device authentication process is terminated. In the case that the content of the signing algorithm identifier when the value of the device authentication effectiveness identifier is a true value (true) does not conform, it is an operational problem whether a default algorithm is selected, or communication is terminated, which is not particularly defined here. It is also an operational problem whether access of the data transmitting station not having the device authentication function to the data receiving station is accepted or not, which is not particularly defined here.

3.5.2.2 Device Authentication Process (1) Device Authentication Process of Data Receiving Station The data receiving station generates random numbers to begin with after shifting a state to the device authentication process. The generated random numbers are transmitted to the data transmitting station by the transmission message of random numbers (ChallengeCodePDU), and the data receiving station wait for a response. Further, the generated random numbers are signed by a password obtained with the initial setting procedure to create signature data. A response by a response message of signature (SignaturePDU) is received from the data transmitting station, and then the signature data stored in the message is compared to the signature data generated in the data receiving station to authenticate the data transmitting station.

The authentication is regarded to be successful when the comparison result is conformable, and it is notified by the acknowledgement message that the access to the data receiving station is allowed. At this time, a state identifier of status "access is allowed" is set in the reservation field. The authentication is regarded to be unsuccessful when the comparison result is not conformable, and it is notified by the acknowledgment response message that the access to the data receiving station is rejected. At this time, the status "access is rejected" is set in the state identifier.

When the content of the received message is different from an anticipated value, the message is destroyed, and waiting for arrival of a new message is performed upon counting it on the number of failure. Further, when the communication connection management timer (CT), or the watchdog timer for transmission schedule (WTTS) is timed out, the communication is disconnected and terminated after the entire content of the process is destroyed. When the number of failure of the authentication to the data transmitting station is less than the number of times of the authentication trial (NA), retrial from the data transmitting station is allowed, and random numbers are generated again and transmitted by the transmission message of the random numbers (ChallengeCodePDU). When it exceeds the number of time of the authentication trial (NA), the communication is immediately disconnected.

When trial of reconnection of the data transmitting station where the communication is disconnected by the authentication failure is allowed, a counter-measure to endless access with high frequency should be considered.

(2) Device Authentication Process of Data Transmitting Station

The data transmitting station receives the transmission message of random numbers (ChallengeCodePDU), and then the random numbers stored in the message are subjected to the signing process with a password set in the data transmitting station. The signature data obtained by the signing process is stored in the response message of signature (SignaturePDU), and transmitted to the data receiving station, the authentication result is waited.

When a report that the authentication is successful is received with the acknowledgement message, the port number of the application is made effective, and the authentication process is ended. When a report that the authentication is unsuccessful is received with the acknowledgement message, the transmission message of random numbers is waited for retrial. When the content of the received message is different from the anticipated value, the message is destroyed, and arrival of a new message is waited. Further, when the communication connection management timer (CT) is timed out during the authentication process, the entire content of the process is destroyed, and the communication is terminated.

It should be noted that whether to reconnect to the data receiving station or not when the communication disconnection is caused by the authentication failure of the data receiving station is not defined as implementation requirements.

(Summary)

As described above, the vehicle communication device according to the preferred embodiment performs a communication in the manner that the inter-vehicle communication M/W between the mobile stations uses the non-network-type protocol. This inter-vehicle communication M/W performs the congestion avoiding control by changing communication parameters such as transmission power, transmission interval, usage channel, and reception sensitivity of its own vehicle and the other vehicles, based on the priority for each application received from a plurality of applications of the upper layer, the priority of each vehicle, and the channel usage rate obtained from the lower layer. Thus, the vehicle communication device according to the preferred embodiment can avoid the congestion to be occurred, and only the vehicles requiring communications can perform communications by priority.

The communication control service unit according to the preferred embodiment performs communication control of its own vehicle on the basis of the communication control information such as transmission power, transmission interval, and reception sensitivity of its own vehicle required by the corresponding vehicle by exchanging the congestion avoiding control information including the communication control information such as transmission power, transmission interval, and reception sensitivity set by its own vehicle with those of the corresponding vehicle. Therefore, in the vehicle communication device according to the preferred embodiment, its own vehicle can adaptively change communication parameters of the other vehicles, and perform the congestion avoiding control of the entire network.

The communication control service unit according to the preferred embodiment is able to previously secure a communication band so as to deal with an emergency application by performing the communication control, watching the channel usage rate (communication channel condition), and to communicate with short delay time, avoiding the congestion of network.

The vehicle communication device according to the preferred embodiment includes the media adaptation processing unit being applicable to the difference between the inter-vehicle communication M/W and the lower protocol unit, thereby allowing the application to communicate ignoring a lower protocol.

The vehicle communication device according to the preferred embodiment can perform the device authentication in the inter-vehicle communication by providing the access management unit, thereby allowing the inter-vehicle communication with high security.

The communication control service unit according to the preferred embodiment can avoid interference from the other vehicles and other communication systems by performing the communication control, watching the channel usage rate (communication channel condition).

While the invention has been shown and described in detail, the foregoing description is in all aspects illustrative and not restrictive. It is therefore understood that numerous modifications and variations can be devised without departing from the scope of the invention.

The invention claimed is:

1. A vehicle communication device, comprising:
a plurality of application units for performing inter-vehicle communication in accordance with a predetermined purpose;
a lower protocol unit for transmitting and receiving data between vehicles; and
a middleware unit intervening between said application units and said lower protocol unit, said middleware unit including:
a transfer service processing unit for delivering and receiving data to/from said application units and identifying a delivery destination of data received by said middleware unit;
a communication control service unit for performing a process to avoid congestion in said inter-vehicle communication and managing a port number for identifying said application units; and
a transmission/reception control processing unit for performing a transmitting and receiving control of said data, wherein
said communication control service unit controls transmission power, transmission interval, and reception sensitivity transmission power in communication of its own vehicle in said process to avoid congestion based on application priority received for each of said application units, vehicle priority of said its own vehicle, and channel usage rate obtained from said lower protocol unit, and
said communication control service unit exchanges said application priority, said vehicle priority, and said channel usage rate of said its own vehicle between said its own vehicle and said other vehicles, generates congestion avoiding control information including transmission power, transmission interval, and reception sensitivity required to set in said other vehicles, and transmits the congestion avoiding control information to said other vehicles, on the basis of said application priority, said vehicle priority, and said channel usage rate of said its own vehicle, and said application priority, said vehicle priority, and said channel usage rate of said other vehicles being received.

2. The vehicle communication device according to claim 1, wherein
said communication control service unit exchanges said application priority, said vehicle priority, and said channel usage rate of said its own vehicle between said its own vehicle and said other vehicles, and performs communication control about transmission power, transmission interval, and reception sensitivity in communication of said its own vehicle, with reference to said application priority, said vehicle priority and said channel usage rate received from said other vehicles.

3. The vehicle communication device according to claim 1, wherein
said communication control service unit performs said communication control of said its own vehicle in accordance with said congestion avoiding control information received from said other vehicles.

4. The vehicle communication device according to claim 1, wherein
said communication control service unit performs said communication control of said its own vehicle in accordance with said congestion avoiding control information received from said other vehicles when said application priority or said vehicle priority of said its own vehicle is lower than a predetermined value, and performs said communication control of said its own vehicle on the basis of said application priority, said vehicle priority, and said channel usage rate of said its own vehicle, and said application priority, said vehicle priority, and said channel usage rate of said other vehicles being received when said application priority or said vehicle priority of said its own vehicle is higher than a predetermined value.

5. The vehicle communication device according to claim 2, wherein
said communication control service unit generates congestion avoiding control information including transmission power, transmission interval, and reception sensitivity required to set in said other vehicles, and transmits the congestion avoiding control information to said other vehicles, on the basis of said application priority, said vehicle priority, and said channel usage rate of said its own vehicle, and said application priority, said vehicle priority, and said channel usage rate of said other vehicles being received.

6. The vehicle communication device according to claim 1, wherein
said communication control service unit exchanges said application priority, said vehicle priority, and said channel usage rate of said its own vehicle between said its own vehicle and said other vehicles, generates congestion avoiding control information including transmission power, transmission interval, and reception sensitivity required to set in said other vehicles, and transmits the congestion avoiding control information to said other vehicles, on the basis of said application priority, said vehicle priority, and said channel usage rate of said its own vehicle, and said application priority, said vehicle priority, and said channel usage rate of said other vehicles being received when said application priority or said vehicle priority of said its own vehicle is higher than a predetermined value, and does not generate and transmit said congestion avoiding control information to said other vehicles when said application priority or said vehicle priority of said its own vehicle is lower than a predetermined value.

7. The vehicle communication device according to claim 2, wherein
said middleware unit further includes a media adaptation processing unit applicable to a plurality of communication protocols of said lower protocol unit.

* * * * *